(12) United States Patent
Petersen

(10) Patent No.: US 7,166,948 B2
(45) Date of Patent: Jan. 23, 2007

(54) APPARATUS AND METHOD FOR DISSIPATING A PORTION OF THE COMMUTATION DERIVED COLLAPSING FIELD ENERGY IN A MULTI-PHASE UNIPOLAR ELECTRIC MOTOR

(75) Inventor: Christian C Petersen, Sandwich, MA (US)

(73) Assignee: Petersen Technology Corporation, Bourne, MA (US)

( * ) Notice: Subject to any disclaimer, the term of this patent is extended or adjusted under 35 U.S.C. 154(b) by 0 days.

(21) Appl. No.: 11/226,094

(22) Filed: Sep. 14, 2005

(65) Prior Publication Data

US 2006/0055270 A1    Mar. 16, 2006

Related U.S. Application Data

(60) Provisional application No. 60/610,155, filed on Sep. 15, 2004.

(51) Int. Cl.
*H02K 1/00*      (2006.01)
(52) U.S. Cl. ...................................... 310/179; 310/184
(58) Field of Classification Search ................ 310/179, 310/184, 68 B, 254, 156.01; 318/254
See application file for complete search history.

(56) References Cited

U.S. PATENT DOCUMENTS

| | | | | | |
|---|---|---|---|---|---|
| 4,481,440 | A | * | 11/1984 | Muller | 310/268 |
| 4,882,524 | A | * | 11/1989 | Lee | 318/254 |
| 5,397,972 | A | * | 3/1995 | Maiocchi | 318/439 |
| 5,844,343 | A | * | 12/1998 | Horst | 310/184 |
| 6,850,029 | B1 | * | 2/2005 | Pollock et al. | 318/727 |
| 7,026,773 | B2 | * | 4/2006 | Petersen | 318/254 |

* cited by examiner

*Primary Examiner*—Thanh Lam
(74) *Attorney, Agent, or Firm*—Mueller Smith & Matto

(57) ABSTRACT

A multi-phase unipolar motor is configured such that each stator pole is formed with bifilar wound primary and inductively associated secondary windings corresponding with one phase. The primary winding at one stator pole corresponding with one phase is coupled with a secondary winding at another stator pole corresponding with another phase to provide a commutational-step defined winding pair. The resultant winding pair assemblage is energized in correspondence with a commutational sequence such that collapsing field energy may be transferred from a primary winding at the termination of one step in the commutational sequence to the secondary winding associated with it in a next succeeding commutational step.

16 Claims, 12 Drawing Sheets

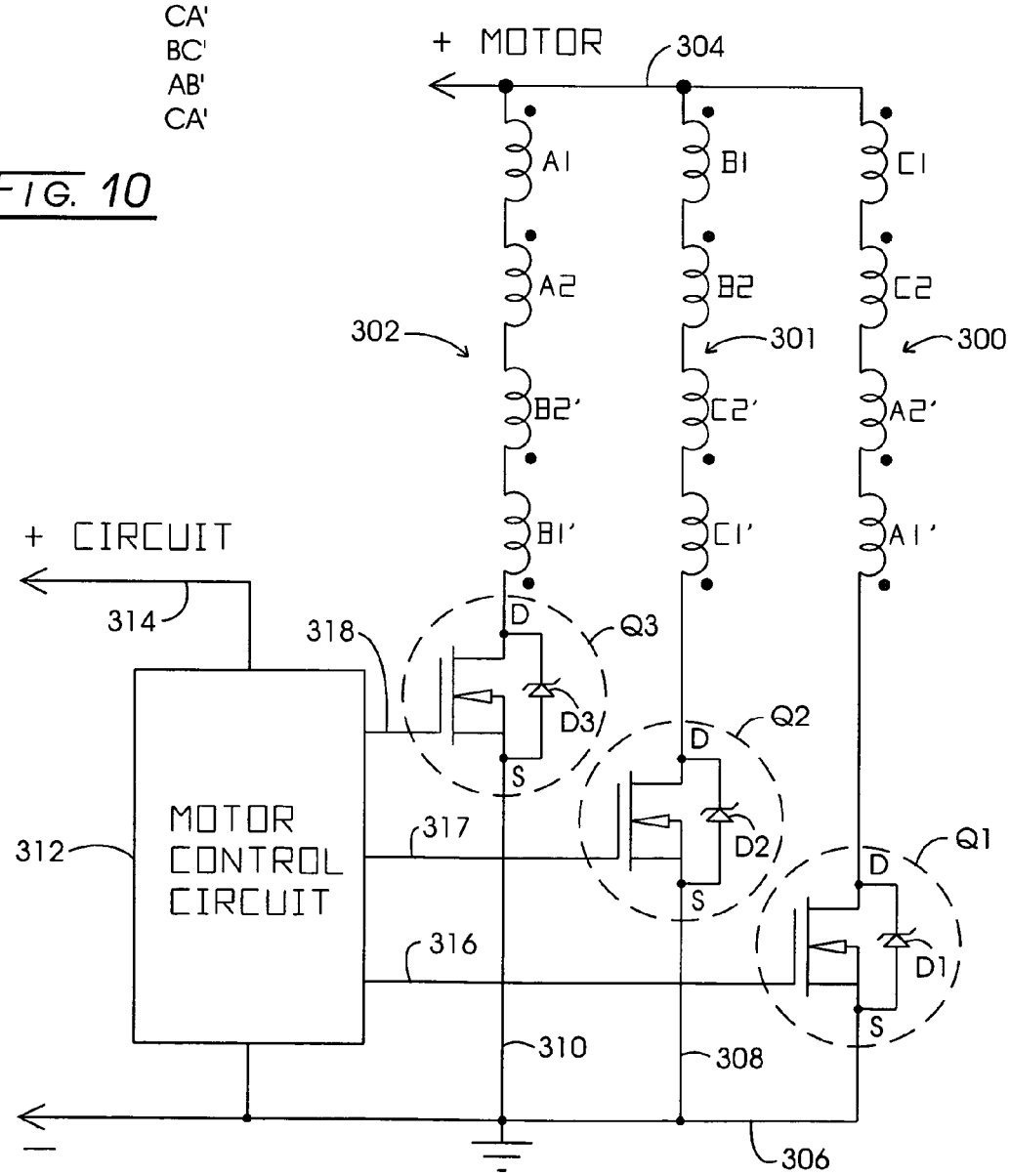

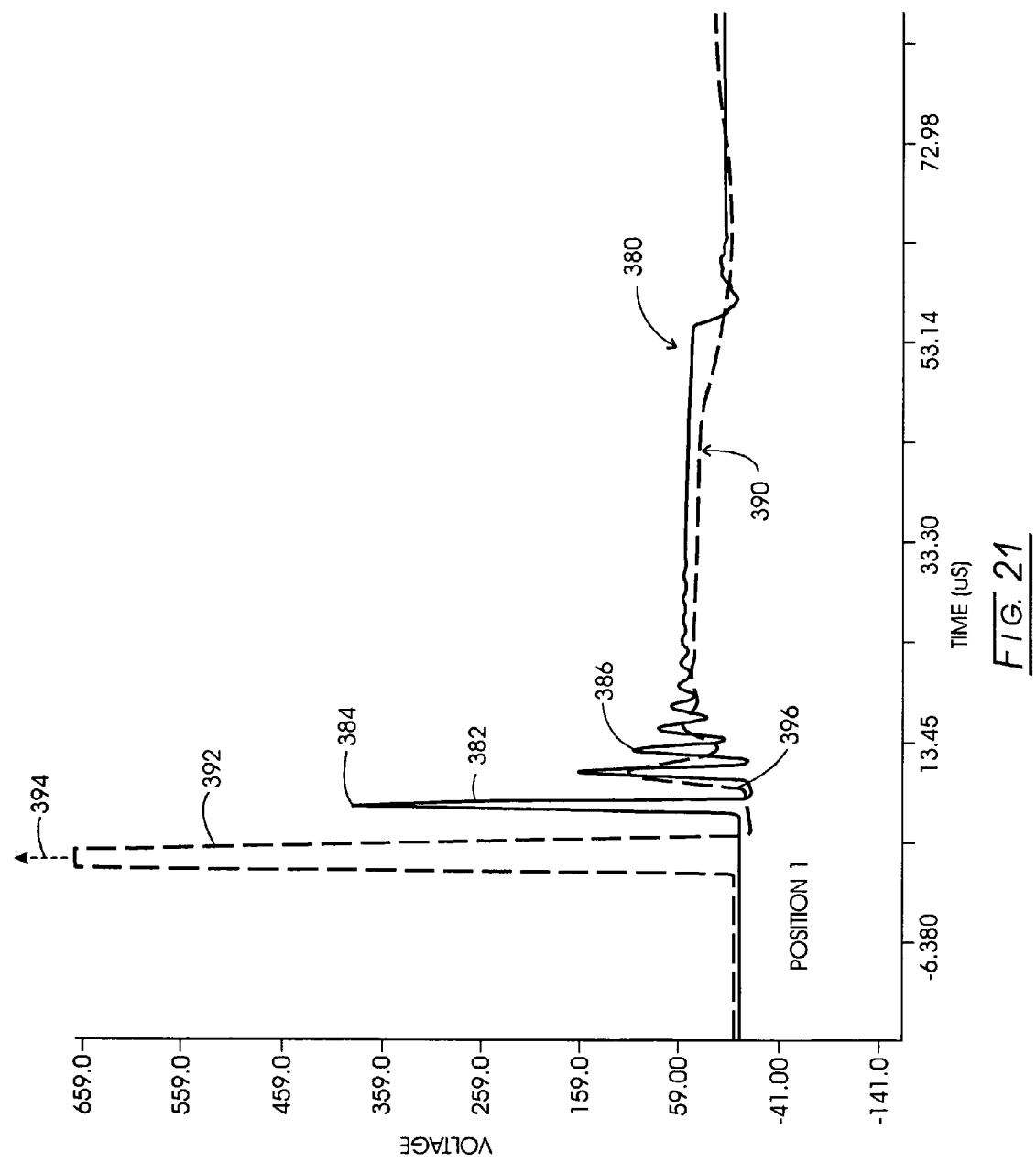

APPARATUS AND METHOD FOR DISSIPATING A PORTION OF THE COMMUTATION DERIVED COLLAPSING FIELD ENERGY IN A MULTI-PHASE UNIPOLAR ELECTRIC MOTOR

CROSS-REFERENCE TO RELATED APPLICATIONS

This application claims the benefit of provisional Application No. 60/610,155, filed Sep. 15, 2004, the disclosure of which is hereby incorporated by reference.

STATEMENT REGARDING FEDERALLY SPONSORED RESEARCH

Not applicable.

BACKGROUND OF THE INVENTION

Investigators in the electric motor arts have been called upon to significantly expand motor technology from its somewhat static status of many decades. Improved motor performance particularly has been called for in such technical venues as computer design and secondary motorized systems carried by vehicles, for example, in the automotive and aircraft fields. With progress in these fields, classically designed electric motors, for example, utilizing brush-based commutation, while relatively inexpensive, have been found to be unacceptable or, at best, marginal performers.

From the time of its early formation, the computer industry has employed brushless d.c. motors for its magnetic memory systems. The electric motors initially utilized for these drives were relatively expensive and incorporated a variety of refinements, for instance as necessitated with the introduction of rotating disc memory. Over the recent past, the computer industry has called for very low profile motors capable of performing in conjunction with very small disc systems and at substantially elevated speeds.

Petersen, in U.S. Pat. No. 4,745,345 entitled "D.C. Motor with Axially Disposed Working Flux Gap", issued May 17, 1988, describes a PM d.c. motor of a brushless variety employing a rotor-stator pole architecture wherein the working flux gap is disposed "axially" with the transfer of flux being in parallel with the axis of rotation of the motor. This "axial" architecture further employs the use of field windings which are simply structured, being supported from stator pole core members, which, in turn, are mounted upon a magnetically permeable base. The windings positioned over the stator pole core members advantageously may be developed upon simple bobbins insertable over the upstanding pole core members. Such axial type motors have exhibited excellent dynamic performance and efficiency and, ideally, may be designed to assume very small and desirably variable configurations.

Petersen in U.S. Pat. No. 4,949,000, entitled "D.C. Motor", issued Aug. 14, 1990 describes a d.c. motor for computer applications with an axial magnetic architecture wherein the axial forces which are induced by the permanent magnet based rotor are substantially eliminated through the employment of axially polarized rotor magnets in a shear form of flux transfer relationship with the core components of the stator poles. The dynamic tangentially directed vector force output (torque) of the resultant motor is highly regular or smooth lending such motor designs to numerous high level technological applications such as computer disc drives which require both design flexibility, volumetric efficiency, low audible noise, and a very smooth torque output.

Petersen et al, in U.S. Pat. No. 4,837,474 entitled "D.C. Motor", issued Jun. 6, 1989, describes a brushless PM d.c. motor in which the permanent magnets thereof are provided as arcuate segments which rotate about a circular locus of core component defining pole assemblies. The paired permanent magnets are magnetized in a radial polar sense and interact without back iron in radial fashion with three core components of each pole assembly which include a centrally disposed core component extending within a channel between the magnet pairs and two adjacently inwardly and outwardly disposed core components also interacting with the permanent magnet radially disposed surface. With the arrangement, localized rotor balancing is achieved and, additionally, discrete or localized magnetic circuits are developed with respect to the association of each permanent magnet pair with the pole assembly.

Petersen in U.S. Pat. No. 5,659,217, issued Aug. 19, 1997 and entitled "Permanent Magnet D.C. Motor Having Radially-Disposed Working Flux-Gap" describes a PM d.c. brushless motor which is producible for incorporation into products intended for the consumer marketplace. These motors exhibit a highly desirable heat dissipation characteristic and provide improved torque output in consequence of a relatively high ratio of the radius from the motor axis to its working gap with respect to the corresponding radius to the motors' outer periphery. The torque performance is achieved with the design even though lower cost, or, lower energy product permanent magnets may be employed with the motors. See also: Petersen, U.S. Pat. No. 5,874,796, issued Feb. 23, 1999.

The above-discussed PM d.c. motors achieve their quite efficient and desirable performance in conjunction with a multiphase-based rotational control. This term "multiphase" is intended to mean at least three phases in conjunction with either a unipolar or bipolar stator coil excitation. Identification of these phases in conjunction with rotor position to derive a necessary controlling sequence of phase transitions traditionally has been carried out with two or more rotor position sensors in discretely different positions. Employment of such mutually spaced multiple sensors adds a considerable cost for an electronic phase commutation structure, inasmuch as utilization of practical integrated circuit packaging to include the sensors is precluded. Simple time domain-based multiphase switching has been considered to be unreliable and impractical since the rotation of the rotor varies in terms of speed under load as well as in consequence of a variety of environmental conditions and "sensorless" controllers which utilize back EMF sensing add considerable cost to the controller over those which use position sensors.

Petersen in U.S. Pat. No. 6,891,343, issued May 10, 2005 entitled "Multiphase Motors With Single Point Sensing Based Commutation" describes a simplified method and system for control of multiphase motors wherein a single sensor is employed with an associated sensible system to establish reliable and more cost effective phase commutation sequencing.

Over the years of development of what may be referred to as the Petersen motor technology, improved motor design flexibility has been realized. Designers of a broad variety of motor driven products including household implements and appliances, tools, pumps, fans and the like as well as more precise systems such as disc drives now are afforded an expanded configuration flexibility utilizing the new motor systems. No longer are such designers limited to the essentially "off-the-shelf" motor varieties as listed in the catalogues of motor manufacturers. Now, motor designs may become components of and compliment the product itself in an expanded systems design approach.

During the recent past, considerable interest has been manifested by motor designers in the utilization of magnetically "soft" processed ferromagnetic particles in conjunction with pressed powder technology as a substitute for the conventional laminar steel core components of motors. So structured, when utilized as a stator core component, the product can exhibit very low eddy current loss which represents a highly desirable feature, particularly as higher motor speeds and resultant core switching speeds are called for. As a further advantage, for example, in the control of cost, the pressed powder assemblies may be net shaped wherein many intermediate manufacturing steps and quality considerations are avoided. Also, tooling costs associated with this pressed powder fabrication are substantially lower as compared with the corresponding tooling required for typical laminated steel fabrication. The desirable net shaping pressing approach provides a resultant magnetic particle structure that is 3-dimensional magnetically (isotropic) and avoids the difficulties encountered in the somewhat two-dimensional magnetic structure world of laminations. See generally U.S. Pat. No. 5,874,796 (supra).

The high promise of pressed powder components for motors and generators initially was considered compromised by a characteristic of the material wherein it exhibits relatively low permeability. However, Petersen, in U.S. Pat. No. 6,441,530, issued Aug. 27, 2000 entitled "D.C. PM Motor With A Stator Core Assembly Formed Of Pressure Shaped Processed Ferromagnetic Particles", describes an improved architecture for pressed powder formed stators which accommodates for the above-noted lower permeability characteristics by maximizing field coupling efficiencies.

Motor and generator technology has been advanced with respect to architectures exhibiting what has become to be known as "vertical stator" devices. As described in U.S. Pat. No. 6,617,747 by Petersen, entitled "PM Motor and Generator With a Vertical Stator Core Assembly Formed of Pressure Shaped Processed Ferromagnetic Materials", issued Sep. 9, 2003 this architecture combines a radially directed magnetic flux transference at a working gap with a pressed powder-based stator structure wherein the stator poles are parallel with the device axis. Improvements in performance and expanded design latitudes are observed.

A radially aligned stator structure achieving enhanced performance with these pressed powder core materials is described in U.S. Pat. No. 6,441,530 by Petersen entitled "D.C. PM Motor With A Stator Core Assembly Formed Of Pressure Shaped Processed Ferromagnetic Particles" issued Aug. 27, 2002.

As the development of pressed powder stator structures for electrodynamic devices such as motors and generators has progressed, investigators have undertaken the design of larger, higher power systems. This necessarily has lead to a concomitant call for larger press molded configurations. The associated pressing process requires significant pressing pressures in order to evolve requite material densities to gain adequate electrical properties. To achieve those densities, press molding is needed in the 40 tons per square inch to 50 tons per square inch range. As a consequence the powder metal pressing industry requires that the molded parts exhibit aspect ratios (width or thickness to length in the direction of pressing) equal to or less than about 1:5 to maintain uniformity throughout the part. Thus as the lengths of stator core component structures increase, their thickness must increase to an extent that a resultant shape becomes so enlarged in widthwise cross section as to defeat important motor design goals, with attendant loss of both the economies of cost and enhanced performance associated with the emerging pressed powder technology.

Petersen, in application for U.S. patent Ser. No. 10/747,538 filed Dec. 29, 2003 entitled "Electrodynamic Apparatus and Method of Manufacture", describes apparatus and manufacturing method for producing larger stator structures comprising pressed powder technologies. While retaining practical shapes and desirable dimensional characteristics, the stator structures are formed to exhibit requisite stator core particle densities. These advantageous aspects are achieved through the utilization of a modular approach to stator core formation.

Production costs for electronically commutated multi-phased motors can further be minimized by controlling the cost of involved electronic components, in particular, by limiting their number. For instance, the number of power devices or switching components required for multi-phased motors is minimized where a unipolar or single sided drive topology is employed. With typical unipolar configurations, the field windings of a given phase are energized in a singular polar sense, i.e., a north polar sense or a south polar sense. Thus, only one power device is required for each phase of the commutational scheme. However, at the point of commutation from one phase to a next in a commutational sequence, the energy necessarily stored in the phase being released must be accommodated for. Collapsing field induced back EMF or flyback voltage spikes encountered will exhibit amplitudes which are 20 times to 30 times that of the supply input to these unipolar configurations. Particularly as mechanical motor power is increased this calls for cost effective methods for removing the negative effects of the flyback voltage spikes. Heretofore, avoidance of those cost constraints has only been achieved through the utilization of unipolar systems with quite low power motor applications as may be evidenced with fan drives for computer applications.

In contrast to a unipolar structure approach, bipolar topology involves the excitation of field windings between one polar sense and an opposite polar sense. In terms of performance, the bipolar approach exhibits many advantageous aspects. For example, 3-phase unipolar systems are commutated at a theoretical 50% of maximum torque level, and, in effect, make use of one third of the total field winding array to achieve rotational drive. In comparison, considerably more expensive bipolar systems with twice the number of power switching devices commutate theoretically at 86% of maximum torque level and, in effect, utilize two thirds of the field winding assemblage to achieve a comparatively higher level of performance. Additionally, the bipolar architecture controls the flyback energy present in a collapsing field.

Notwithstanding these enhanced performance aspects associated with bipolar phase excitation design, the marketplace for electric motors is cost driven. Should practical electronic commutation approaches be achieved for higher power multiphase single sided drive systems, for example, in the 10 watt to 100 watt and above mechanical drive power range, the many advantageous performance and design flexibility aspects of brushless motor technology, albeit with unipolar based performance, will be made available to commerce at costs competitive with dated d.c. brush, universal and a.c. induction motor technologies.

Bringing the cost of electronically commutated unipolar multiphase motors to competitive and practical levels with the ubiquitous brush commutated motors, calls for corrective innovation with respect to three basic aspects, to wit; (a) overcoming the high costs associated with the use of multiple sensors in the commutation scheme; (b) making effective use of and practically forming pressed powder stator structures; and (c) providing a commutation system of competitive cost which practically and efficiently treats collapsing field back EMF or flyback phenomena. Thus, a trilogy of innovations are necessitated to bring the highly desirable features of multi-phase unipolar motor architecture into esse. One palliative component of that trilogy addressed to aspect (a) is the single sensor based commutation system described in application for U.S. patent Ser. No. 10/706,412 (supra), The second solutional component of that trilogy addressed to aspect (b) is the improved pressure shaped processed ferromagnetic particle stator technology described in U.S. Pat. Nos. 6,441,530; 6,617,747; and 6,707,224 (supra) and the modular approach to stator core formation described in application for U.S. patent Ser. No. 10/747,538 (supra).

BRIEF SUMMARY OF THE INVENTION

The present invention is addressed to the third aspect of the innovative trilogy wherein a commutation system of competitive cost is realized in multiphase unipolar, or single sided, motors through the practical treatment of collapsing field energy. With this treatment, each stator pole is wound with a primary or phase companion winding as well as an inductively associated secondary or phase component winding for a given phase. Such windings are utilized in an opposed polarity sense. Commutation does not occur in a conventional sequence of, for instance, three phases (A, B, C). By contrast, commutational-step defined winding pairs (a combination of two phases) are provided wherein one or more primary windings of one phase at one or more stator poles are electrically connected with one or more secondary windings of another phase, each phase being energized in opposite polar sense. Each of these winding pairs are coupled between a common source of one polarity and a power switching device coupled, in turn, to a return of opposite polarity. For example, three such winding pairs will be present in a 3-phase unipolar motor. Winding pairs then are energized and de-energized from the switching devices in a winding pair based commutational sequence wherein the collapsing field energy from one of the energized winding or windings of one phase will be at least partly inductively and additively transferred to the phase companion winding or windings that is part of the next winding pair energized in the commutational sequence.

The result is a substantial decrease in both the amplitude and duration of the back EMF spike to an extent diminishing its energy to levels readily managed by the power switching devices. The approach at hand is generally referred to as a "biphase unipolar drive" or "BUD". Where generally lower voltage motors are configured with the BUD technology typically, field effect transistors (FET) are employed as the switching devices. It has been found to be beneficial in certain applications to locate a small capacitor across the switch terminals for these lower voltage motors. A capacitance value of about 0.1 uf is contemplated.

Employment of pressure-shaped processed powdered metal for stator core assemblies has been seen to be serendipitous. As the fields collapse they are within the equivalent of a resonant or tank circuit. Thus, high frequency ringing is encountered to permit an inductive coupling between primary and secondary windings. This coupling is enhanced by using stators formed from processed powdered metal which maintains its permeability and therefore its coupling effectiveness over a wider frequency range than steel laminations. Accordingly, the ringing phenomena is supported with little loss and consequent heat generation.

With this third component of the trilogy of the innovations, electronically commutated 3-phase unipolar PM d.c. motors with their important higher efficiencies become practical and cost competitive with conventional a.c. induction motors and outperform simple one phase and two phase motor architectures that are electronically commutated.

Another feature and object of the invention is to provide a method for dissipating collapsing field energy in an electric commutational multi-phase motor having a rotor and stator assembly with a plurality of stator poles and field windings wound on said poles configured for single sided drive excitation from a source, comprising the steps of:

(a) providing a phase component winding at each stator pole energizable from the source in a first polar sense;

(b) providing a phase companion winding at each stator pole in inductive coupling relationship with the phase component winding and energizable from the source in a second polar sense opposite the first polar sense at a subsequent step in the commutational sequence;

(c) electrically connecting a phase component winding of one stator phase with a phase companion winding at another stator phase to define field winding pairs, each corresponding with a step in a commutational sequence; and (d) energizing the field winding pairs from the source in the commutational step sequence effecting the driven rotation of the rotor and inductively coupling at least a portion of the collapsing field energy present at the termination of energization of the field windings corresponding with one step with the phase component winding of a next step in the commutational sequence.

Another feature and object of the invention is to provide a method for dissipating at least a portion of the commutation derived collapsing field energy in a multi-phase unipolar electric motor, comprising the steps of:

(a) providing a stator assembly with a plurality of stator poles;

(b) providing a primary and inductively associated secondary winding at each stator pole corresponding with one phase;

(c) electrically connecting the primary winding or windings at one stator pole or poles corresponding with one phase with a secondary winding or windings at another stator pole or poles corresponding with another phase to provide a commutational-step defined winding pair and repeating that connecting of primary and secondary winding or windings to derive a winding pair assemblage corresponding with a commutational sequence for multi-phase performance; and (d) controllably energizing the winding pair assemblage in correspondence with the commutational sequence and in a manner wherein the collapsing field energy is inductively transferred at a stator pole from a primary winding at the termination of one step in the commutational sequence to the secondary winding associated with it in the next succeeding step in the commutational sequence.

Other objects of the invention will, in part, be obvious and will, in part, appear hereinafter.

The invention, accordingly, comprises the apparatus and method possessing the construction, combination of elements, arrangement of parts and steps which are exemplified in the following detail description.

For a fuller understanding of the nature and objects of the invention, reference should be had to the following detailed description taken in connection with the accompanying drawings.

BRIEF DESCRIPTION OF THE DRAWINGS

FIG. 10 is a commutational-step defining winding pair sequence for clockwise and counterclockwise operation;

FIG. 11 is an electrical schematic representation of a BUD topology for the motor structure of FIGS. 6–9;

FIG. 21 is an enlarged superpositioning of the copies of the oscillotraces of FIGS. 15 and 16.

DETAILED DESCRIPTION OF THE INVENTION

In the discourse to follow, the architecture of two electronically commutated d.c. PM motors employed in testing in effect three motors, one with the 3-phase unipolar configuration and methodology of the invention, the same motor with a conventional 3-phase unipolar structuring, and a larger 3-phase unipolar motor configured according to the invention are described. Next, the discussion turns to the circuitry and winding topology of motors configured in accordance with the invention, whereupon a representative motor schematic layout and torque curve diagram is discussed with respect to a 3-phase unipolar or single sided drive motor employing the features of the invention. A more detailed electrical schematic of such a motor then is illustrated whereupon an electrical schematic diagram is provided showing a test setup with respect to either of the earlier-described motors employing the methodology of the invention. The discourse ends with an oscilloscope trace-based comparative discussion concerning the tested motors formed with and without the features of the invention. Those features are generally referred to as "biphase unipolar drive" (BUD).

Figure 1:
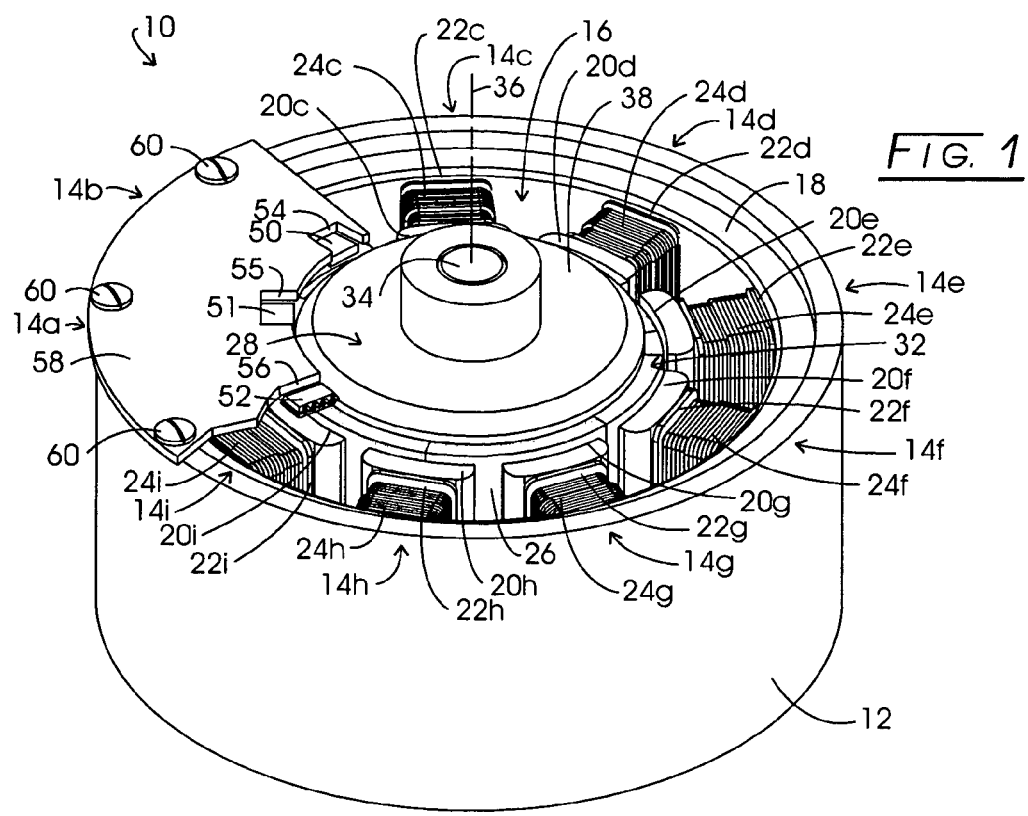
FIG. 1 is a perspective view of a motor having a radial architecture and incorporating the biphase unipolar drive (BUD) features of the invention.
Figure 2:
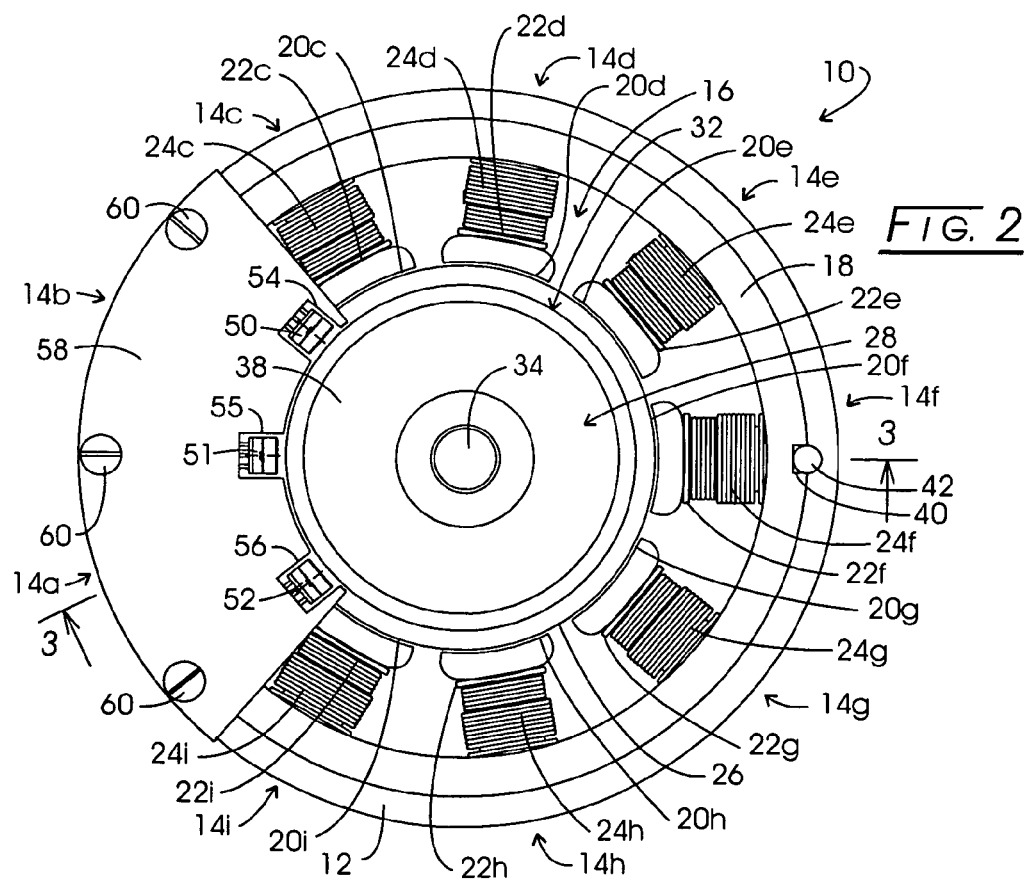
FIG. 2 is a top view of the motor of FIG. 1

Referring to FIGS. 1 and 2, a motor is represented generally at 10 which incorporates the noted biphase unipolar drive. Motor 10 is configured with a cylindrically-shaped outer housing 12. Outer housing 12 may be configured of a suitable metal, for instance aluminum, or the above-noted pressed processed ferromagnetic particles. Inwardly of the housing 12 is a radially disposed array of nine stator poles 14a–14i, stator poles 14c–14i being visible in the figure. Stator poles 14a–14i are configured with a stator core assemblage represented generally at 16. Assemblage 16 is formed of the noted pressed processed ferromagnetic particles and is configured with integrally formed stator cores which extend radially inwardly to expand in the manner of a flange and define corresponding flux interaction regions 20a–20i, flux interaction regions 20c–20i being visible in the figure. Each radially inwardly depending stator pole of the stator core assembly 16 contains a winding region which is surmounted by an electrically insulated winding shield 22a–22i, shields 22c–22i being seen in FIGS. 1 and 2. Over each of the winding shields 22a–22i there is provided a bifilar wound field winding assembly 24a–24i, winding assemblies 24c–24i being visible in FIGS. 1 and 2. Each of the field winding assemblies 24a–24i is comprised of a phase designated primary winding or phase component winding which is combined with an inductively associated secondary winding or phase companion winding.

The flux interaction regions 20a–20i of respective stator poles 14a–14i extend radially inwardly in spaced relationship with the confronting magnetic surface 26 of a rotor represented generally at 28. Rotor 28 carries a six segment or region cylindrical permanent magnet represented generally at 32. The rotor is mounted for rotation upon a shaft 34 disposed about a motor axis 36. With the arrangement shown, the motor 10 thus is deemed to have a "radial" architecture wherein primary flux transfer is perpendicular to the axis 36 across the flux working gaps established between the confronting magnetic surface 26 and the corresponding flux interaction regions 20a–20i of stator poles 14a–14i. Stator core assembly 16 is retained in position with respect to housing 12 by a rectangular slot seen in FIG. 2 at 40 molded within the outside surface of backiron region 18 and which receives a steel retainer pin 42.

Motor 10 employs a control circuit which carries out commutation utilizing three spaced apart sensors implemented as Hall effect devices. FIGS. 1 and 2 reveal these three devices at 50–52. In this regard, the devices 50–52 are mounted beneath respective rectangular openings 54–56 formed within a circuit board segment 58 mounted by machine screws as at 60 threadably engaged within the top surface of cylindrical housing 12. The mounting of the sensors 50–52 beneath the board 58 locates them in closer proximity to the upper edge of the rotor magnet 32. This 3-sensor approach to commutation with the nine stator pole/six rotor pole architecture permits commutation sensing to occur as each rotor magnet polarity transition occurs during rotation.

Figure 3:
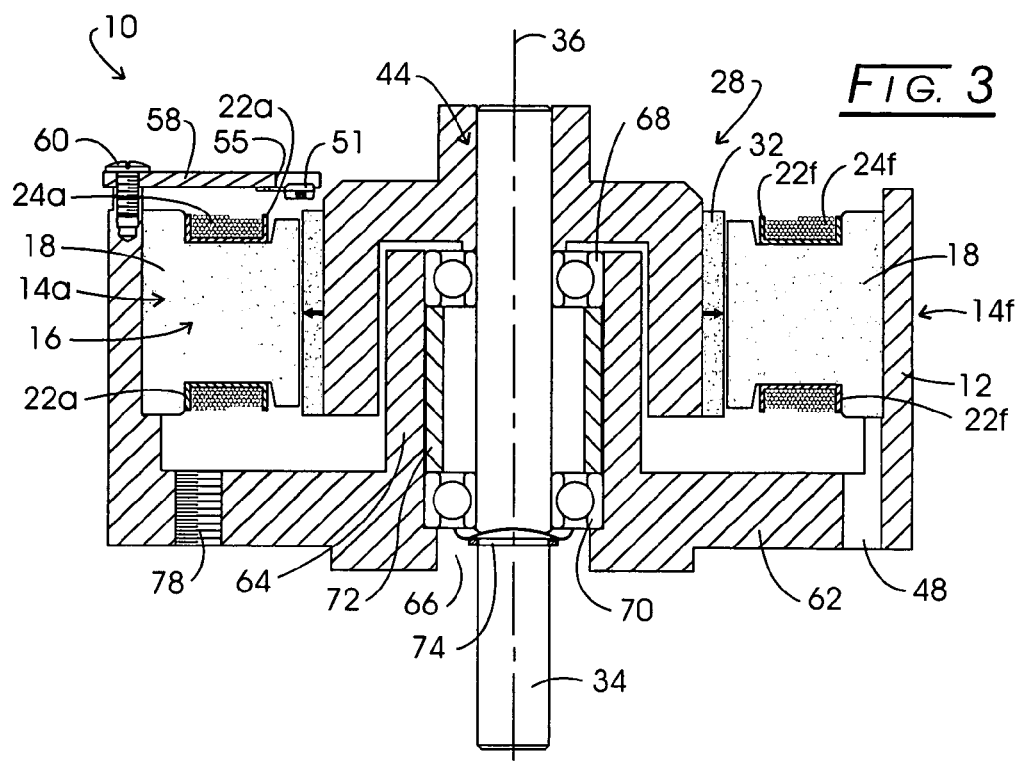
FIG. 3 is a sectional view taken through the plane 3—3 shown in FIG. 2.

Turning to the sectional view provided in FIG. 3, housing 12 is seen to be configured with a housing base portion 62 extending toward axis 36. The base portion 62 then extends into the motor cavity to provide an integrally formed rotor support column 64 of cylindrical configuration establishing a support cavity 66 symmetrically disposed about axis 36. Within support cavity 66, two ball bearing assemblies 68 and 70 are mounted disposed about axis 36 for supporting shaft 34 which extends inwardly from its fixed connection with rotor 28 at rotor region 44. Bearing assemblies 68 and 70 are spaced along axis 36 by a cylindrical spacer 72 and are retained in position by a retaining ring and wavy washer assembly 74.

The figure illustrates the pressed processed powder stator core assembly including its profile at the stator poles 14a and 14f. At stator pole 14a, note the presence of an electrically insulative winding shield 22a. In similar fashion an electrically insulative winding shield 22f is provided at stator pole 14f. The shields extend inwardly from the backiron region 18 toward the flux interaction region, for example, at 22a and 22f. Field windings 24a and 24f are illustrated in the instant figure. Essentially each of these windings is comprised of two co-wound wires with two start and two finish leads. A threaded mounting bore is shown in the figure at 78. Motor 10 was configured with the noted biphase unipolar drive (BUD) for purposes of testing its performance.

Figure 4:
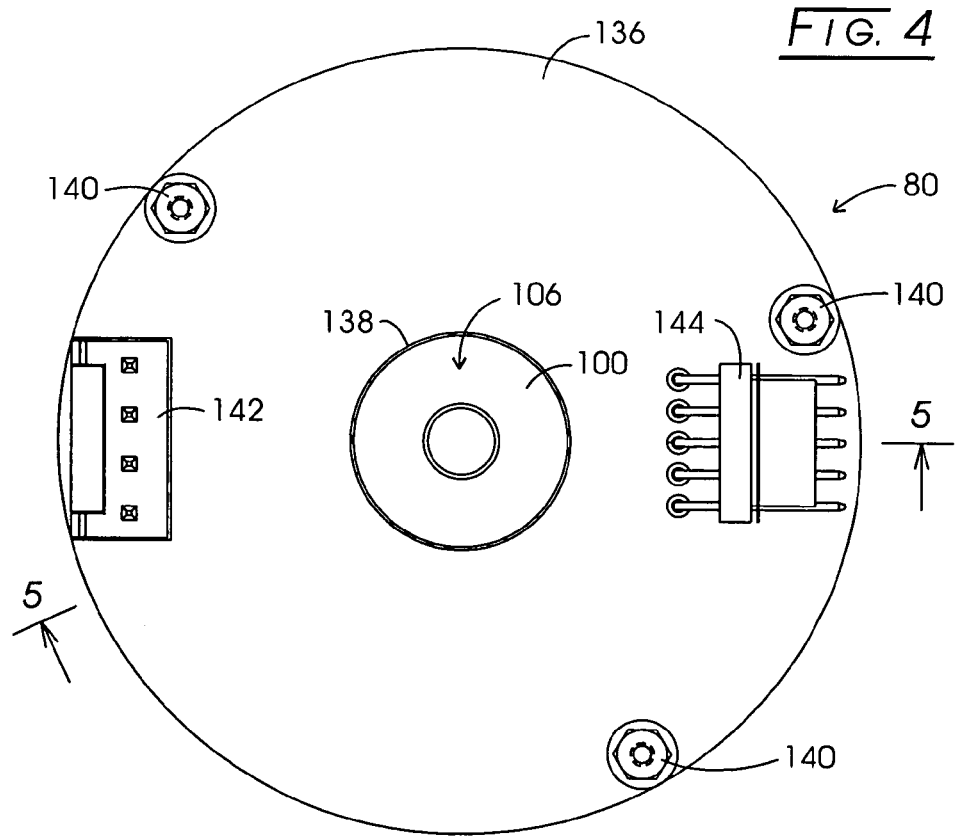
FIG. 4 is a top view of another electric motor which may incorporate the BUD features of the invention and exhibiting a vertical stator architecture.
Figure 5:
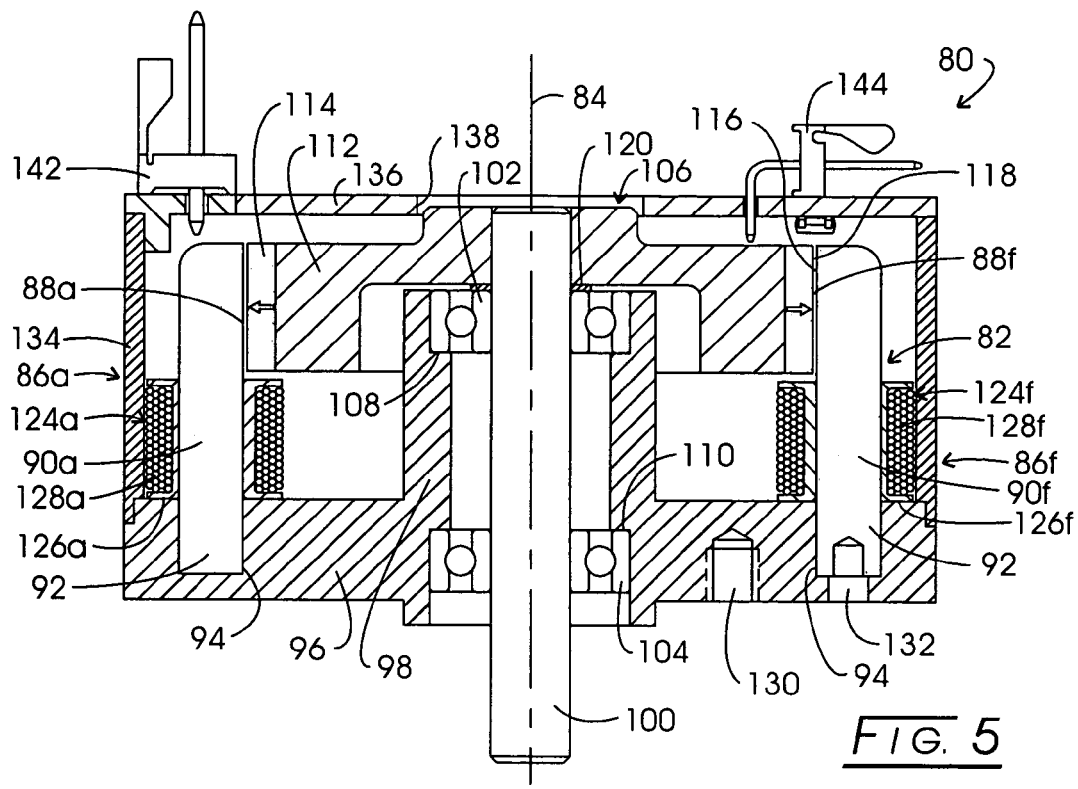
FIG. 5 is a sectional view taken through the plane 5—5 shown in FIG. 4.

Comparative testing also was carried out with a motor having the architecture of FIGS. 4 and 5. This motor was wound with a biphase unipolar drive (BUD) of the invention, whereupon its performance was evaluated. The same motor was provided with conventional field windings for 3-phase unipolar performance and was tested in that configuration.

Referring to FIGS. 4 and 5, this motor is represented generally at 80. Motor 80 is described in the industry as a "vertical stator" motor. It utilizes the same pressed processed ferromagnetic particle technology again with a ring-shaped stator core assembly having upstanding stator poles integrally formed with an annulus shaped lower disposed backiron. In FIG. 5, the ring-shaped stator core assembly is represented generally at 82 symmetrically disposed about a motor axis 84. The stator core assembly 82 is configured, as in the case of motor 10, with a nine stator pole architecture. Two upstanding stator poles are represented in FIG. 5 at 86a and 86f an identification remaining in consonance with the description of motor 10 in FIG. 3. Looking to the stator core assembly, each stator pole core includes a flux interaction region, two of which are identified at 88a and 88f. The flux interaction regions as exemplified at 88a and 88f are each integrally associated with a winding region as at 90a and 90f. These winding regions also are arranged generally in parallel with the axis 84 and extend a field winding length from a location in spaced adjacency with the flux interaction region to an integrally formed annulus-shaped backiron region 92. Backiron region 92 is mounted within an annular groove 94 formed within a metal base represented generally at 96. Base 96 may, for example, be fashioned of aluminum. The base further is configured to define an open cylindrical bearing housing 98 which is symmetrically disposed about motor axis 84 and functions to rotatably support a motor shaft 100 with ball bearings 102 and 104. In this regard, the inner races of bearings 102 and 104 support and permit the rotation of shaft 100 which is fixed to the motor rotor represented generally at 106. Note that bearing 102 is supported upon an annular ledge 108 formed within bearing housing 98, while bearing 104 is retained by a retaining ring arrangement (not shown) against a downwardly depending annular ledge 110 formed within bearing housing 98. A washer 120 is seen positioned between the underside of rotor 106 and bearing 102.

Rotor 106 is formed of a soft steel and configured with a backiron region 112. That backiron region, in turn, supports a permanent magnet 114 which is shaped having six alternating regions of polarity as in the case of rotor 28 of motor 10. The regions of alternating polarity present a confronting magnetic surface 116 spaced from the flux interaction regions as at 88a and 88f to define a flux working gap 118.

Each of the nine stator poles as at 86a and 86f support a field winding assembly as represented at 124a and 124f. These assemblies are configured with an electrically insulative bobbin, two of which are shown at 126a and 126f slidably mounted over the winding regions as at 90a and 90f. The bobbins as at 126a and 126f, in turn, support field windings as at 128a and 128f. These field windings were configured as conventional 3-phase unipolar windings and alternatively with a BUD topology.

Base 96 further is configured with a threaded mounting bore 130 and a pin receiving registry bore 132 functioning to stabilize the stator core assembly 82 against rotation. A cylindrically shaped motor sleeve 134 is supported from the base 96, to in turn, support a top cover 136. Cover 136 is formed with a centrally disposed opening 138 and is retained in position by three machine screws 140. This cover supports a terminal assembly 142 functioning to bring power out of motor 80 and a five lead assembly 144 employed with three Hall effect-type sensors utilized in the 3-phase commutation topology of the motor.

The stator core assemblies 16 and 82 of respective motors 10 and 80 are formed of a processed ferromagnetic powder material identified as EXP-1 provided by Hoeganaes of Cinnaminson, N.J.

Figure 6:
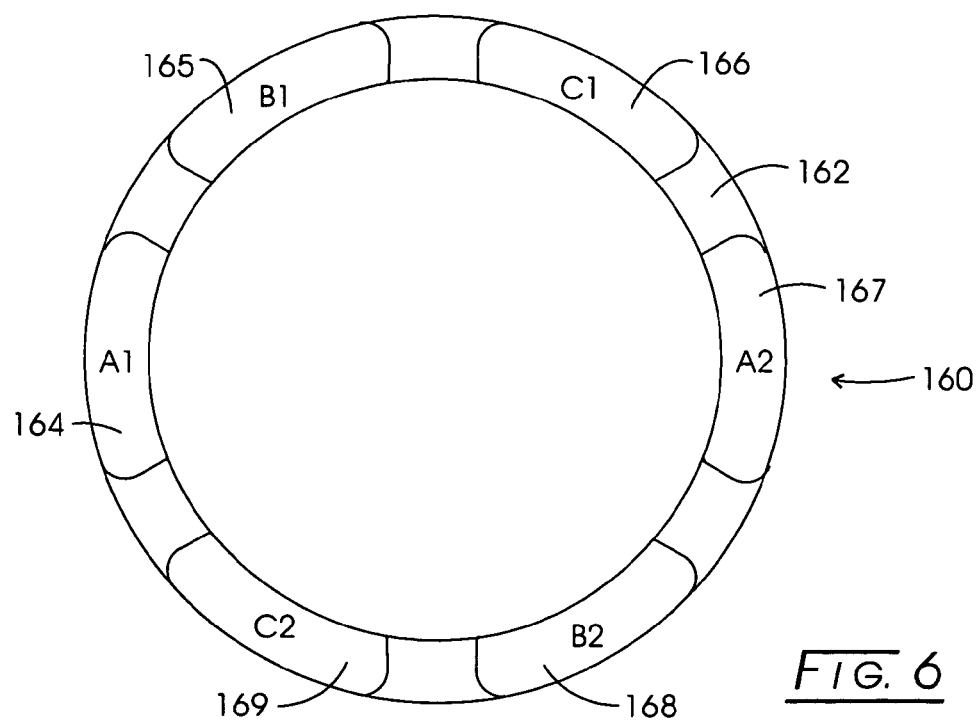
FIG. 6 is a top view of a stator core assembly exhibiting a six pole architecture.

The description now turns to the topology and technique of the biphase unipolar drive of the invention. To facilitate the description of this drive it is illustrated in connection with a vertical stator 3-phase motor configured with six stator poles performing in conjunction with a rotor exhibiting four regions of alternating polarity. The stator core assembly for such a motor architecture is represented in general at 160 in FIG. 6. In the figure, the assembly 160 will be formed of pressure shaped processed ferromagnetic powder metal and for a vertical stator structure will incorporate an annulus shaped backiron region 162 and six upstanding stator poles 164–169 which are the core components of corresponding stator poles identified respectively at A1, B1, C1, A2, B2 and C2.

Figure 7:
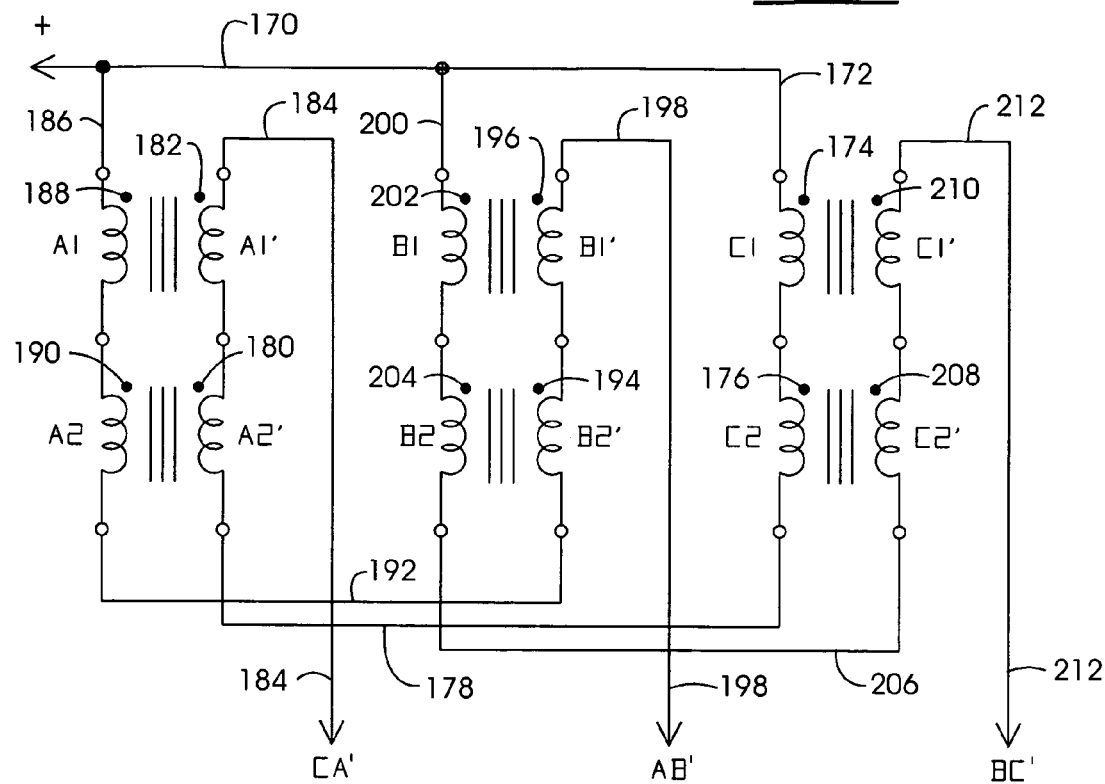
FIG. 7 is an electrical schematic view of paired windings associated with a six stator pole implementation of a 3-phase unipolar motor implementing the BUD topology.

Referring to FIG. 7 a schematic portrayal of the dual windings of a BUD wound system is set forth in conjunction with the above-identified alphanumeric stator pole designations. The six stator poles illustrated are shown with inductively paired windings. In this regard, those windings referred to as phase companion windings and which may be considered to emulate the primary side of a transformer are identified arbitrarily in primed fashion, while the inductively associated windings which emulate a secondary winding of a transformer, referred to as phase component windings, are shown arbitrarily without prime. Solid dots are utilized in the figure to indicate a winding start, while open circles within the leads represent connection points. The alphanumerical winding designations as well as the alphabetical phase designations are arbitrary. Additionally, particularly where the windings are coupled in series circuit fashion the positioning of windings for purposes of schematic illustration is arbitrary and generally will be based upon the most efficient interconnection scheme to be utilized. While 3-phases generally designated as A, B, C are identified, the energization of the phases is delivered in a biphase manner to the extent that the commutational steps are carried out with a "winding pair" involving two such phases with opposed energized polarities.

Looking momentarily to FIG. 10, the commutational-step defining winding pair sequences for a BUD system motor for clockwise and counterclockwise operation are set forth. Each of those steps represent a winding pair. For illustrative purposes, clockwise operation is described in conjunction with the winding pair commutational sequence: CA', AB' and BC'. Returning to FIG. 7, the positive rail or common for the commutational system at hand is represented at line 170. Looking initially to the winding pair CA', note that line 170 extends to line 172 incorporating windings C1 and C2 which are seen associated with respective start dots 174 and 176 and may be considered as secondary or phase component windings. Line 172 extends as represented at line portion 178 to encounter serially connected primary or phase companion windings A2' and A1'. Note that these windings are illustrated in connection with respective start dots 180 and 182. It is assumed that all windings proceed in the same direction i.e., clockwise or counterclockwise, therefore upon energization generating opposite polarities at respective phase poles C1, C2 and A1'; A2'; etc. As represented at line portion 184 the winding pair extends to provide for activation of the winding pair commutational step CA'. Thus, with the activation of that step windings A1', A2'and C1, C2 are energized. As in a bipolar activated motor employing a "Y" type of phase interconnection and the same rotor/stator pole combination, the BUD activation process adds two slightly displaced phase torque curves (C+A') to achieve an energized phase (CA'). This means that in a 3-phase BUD motor two-thirds of the stator poles are activated for each step in the commutational sequence as in a bipolar driven "Y" interconnected motor. In contrast standard unipolar drive activates only one-third of the stator poles per commutation step.

Looking to the next winding pair in the commutational sequence, AB', note that windings A1 and A2 extend from common or rail 170 as represented at line 186. These secondary or phase component windings A1 and A2 are seen associated with respective start dots 188 and 190. Line 186 is seen to extend as represented at line portion 192 to encounter primary or phase companion windings B2' and B1'. Note that these windings are illustrated in association with respective start dots 194 and 196. Line portion 192 then continues as represented at line portion 198 to the terminal of the winding pair commutational step identified at AB'. Accordingly, as winding pair CA' is turned off or de-energized at the termination of its commutational step, windings A1, A2 and B1', B2' are turned on. In consequence, each collapsing field represented at primary or phase companion windings A1' and A2' will be inductively coupled with secondary or phase companion windings A1 and A2 which are activated. The collapsing field at point 182 will become positive with respect to the common rail 170 and will be additively coupled with secondary windings A1 and A2.

Now turning to the third winding pair in the commutational step sequence, BC', note that secondary or phase component windings B1 and B2 are illustrated within line 200 extending from common or rail 170. These windings B1 and B2 are seen associated with respective start dots 202 and 204 and line 200 is seen to extend via line portion 206 to confront primary or phase companion windings C2' and C1'. Note that these windings are illustrated in association with respective start dots 208 and 210 and the winding pair continues as represented at line portion 212 to the commutational winding pair terminal BC'. With this arrangement, as the winding pair AB' is de-energized at the termination of a commutational step, windings B1' and B2' will exhibit a back EMF or collapsing field. Because secondary winding or phase component windings B1 and B2 will be activated with commencement of the commutational step BC', there will be a collapsing field inductive energy transference from windings B1', and B2' in an additive manner to the secondary windings B1 and B2. The commutational sequence then repeats with the turning off of winding pair BC' and turning on of winding pair CA'. This arrangement for additive inductive coupling will be seen to substantially reduce amplitude of the back EMF or field collapse associated with the energization and de-energization of the winding pairs.

Figure 8:
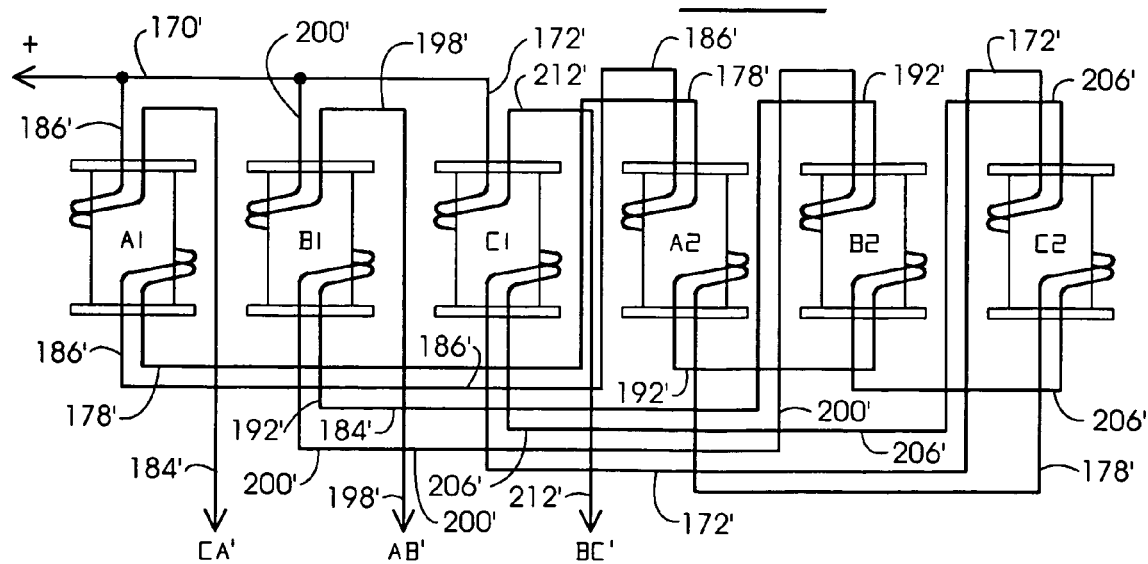
FIG. 8 is a winding diagram for the winding pair arrangement of FIG. 7.

Looking to FIG. 8, a winding scheme corresponding with the electrical schematic diagram of FIG. 7 is presented. Stator poles A1, A2, B1, B2 and C1, C2 are represented by symbols carrying the shape of the earlier-described electrically insulative bobbin. The bifilar winding arrangement as numerically identified in FIG. 7 is imported into FIG. 8 but in primed fashion. Thus, looking to winding pair commutational step CA', line portion 172' is seen extending from common or rail 170' to enter the top of stator pole Cl whereupon it continues with that identification to the top of stator pole C2, emerging therefrom at winding 178' to enter stator pole A2 at the bottom and emerge at the lower level again identified at 178' to extend again as line 178' to the bottom of winding A1, whereupon it emerges from the top of winding of A1 to be directed to the commutational terminal CA' as line 184'.

Now looking to winding pair AB', line 186' is seen to extend from common 170' to the top of stator pole A1 whereupon it emerges, still identified as line 186' to extend to the top of stator pole A2. Emerging therefrom as line portion 192' it then extends to the bottom of stator pole B2 emerging with the same line identification to extend to the bottom of stator pole B1 and emerging from the top thereof as line portion 198' extending to the commutational winding pair terminal AB'.

Now looking to the winding establishing winding pair BC', line 200' is seen extending from common 170' to the top of stator pole B1, emerging therefrom with the same numeration to extend to the top of stator pole B2. Emerging from the bottom of stator pole B2 and identified as line portion 206' the winding then extends to the bottom of stator pole C2. Emerging therefrom with the same numerical identification, the line portion extends to the bottom of stator pole C1 emerging from the top thereof identified now as line 212' which extends to the winding pair terminal BC'.

Figure 9:
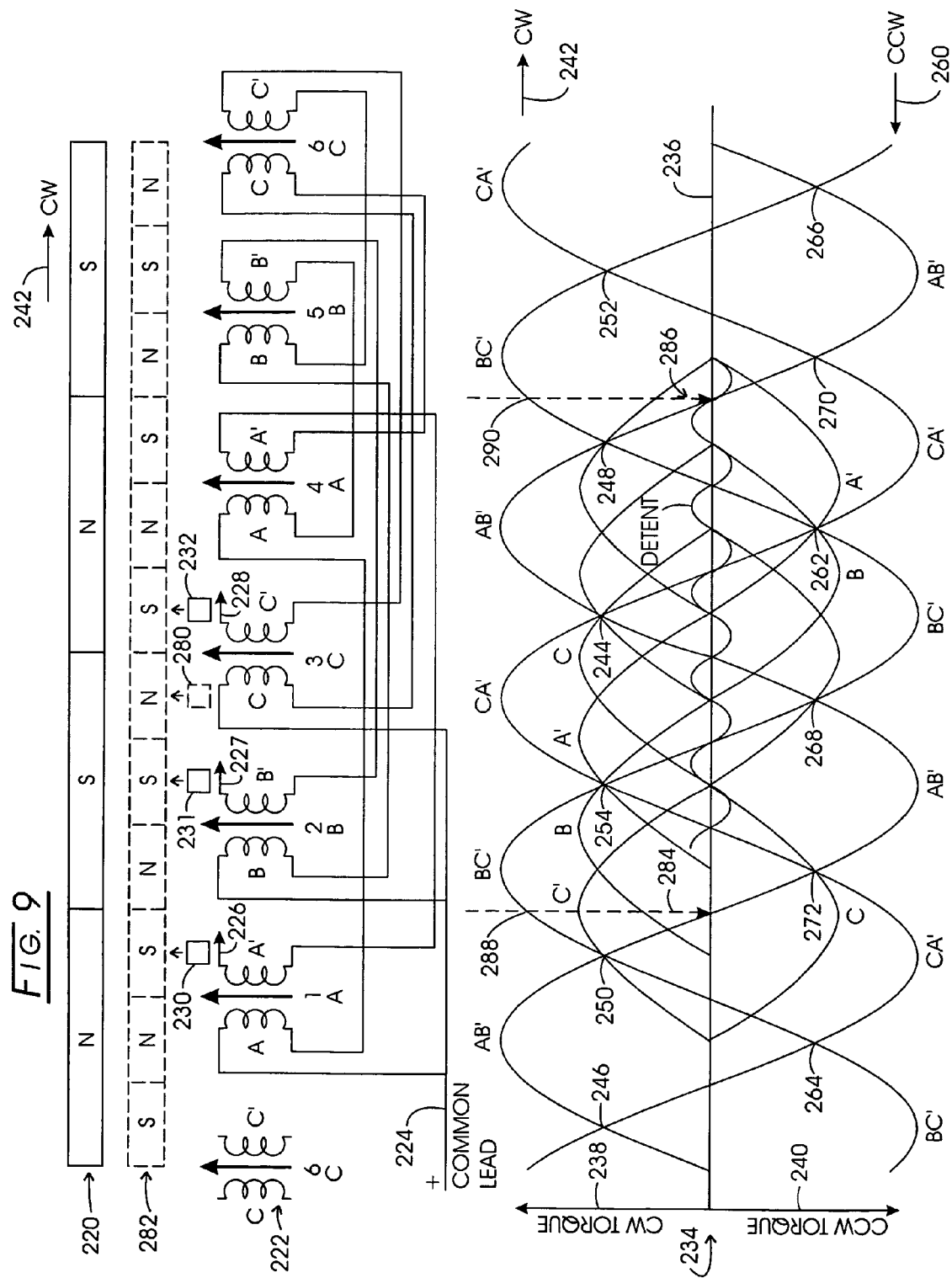
FIG. 9 is a developed representation of the six stator pole four rotor pole motor structure described in connection with FIGS. 6–8 showing winding pair components in conjunction with torque curves and further showing a single point commutational sensing scheme in phantom.

The unipolar 3-phase performance characteristics of motors employing the BUD topology may be illustrated in connection with the motor schematic development diagrams and torque curves provided in FIG. 9. A developed rotor magnet exhibiting four poles is represented at level 220 and is seen to incorporate two N-S pairs. One pole of the rotor magnet 220 corresponds with 90° of mechanical rotation and 180° of electrical rotation. The rotor magnet as at 220 is assumed to be performing rotationally in conjunction with the six stator poles represented in general at level 222 and numbered 1–6, wherein stator poles one and four represent a phase A with phase component windings A and phase companion windings A'. Stator poles two and five represent a phase B each with a phase winding component B and a phase companion winding B'. Stator poles three and six represent a phase C with phase component winding C and phase companion winding C'. Operation of the schematically and graphically depicted motor will be in a 3-phase unipolar fashion meaning three commutational steps per 360° of electrical rotation. Note that each winding pair AB', BC' and CA' will represent two opposite polarity fields when activated. For instance, in FIG. 9 for CW operation with phase pair BC' energized, in the rotor position shown, phase B will be south field polarized and phase C' will be north field polarized. Conversley phase CA' could also be energized in this rotor position for CW or CCW operation. For CW operation phase C will be N field polarized and phase A' will be S field polarized. Winding interconnections as described in connection with FIG. 8 are schematically repeated, the common lead or rail being represented at line 224 and the commutational-step defined winding pairs being represented at lines 226–228. Looking momentarily to FIG. 10, a CW or CCW sequence is depicted. A commutational sensing system is illustrated as it was utilized in connection with the performance of motors 10 and 80, the physical positioning of the Hall effect based sensors being represented at blocks 230–232.

The orientation of the rotor poles at 220 is representative of a maximum phase C torque condition wherein stator poles C are centered at the junction or transition between north and south poles at 220, while, for phase pair CA', phase A companion winding A' is located at an over-center position with respect to the rotor 220 poles and is energized in opposite polarity to phase winding C.

Now look to the torque curves for these phase associated commutational winding pairs as shown in general at 234 in conjunction with a zero torque defining axis 236. Clockwise torque levels are represented by ordinate arrow 238 as increasing in an upward sense and counterclockwise torque is represented by an arrow at 240 as increasing in a downward sense. For clockwise rotation of the rotor 220 as represented at arrows 242 for 3-phase unipolar operation, the commutation from winding pair to winding pair occurs theoretically at 50% of maximum torque for the elected direction. Accordingly, for clockwise operation, commutation will occur with respect to commutational winding pair CA' to the next winding pair defined phase AB' as schematically represented at points 244 and 246. With the occurrence of such commutation, the next commutation point will be between commutational winding pairs AB' and BC' as represented at points 248 and 250. Finally, commutation between winding pairs BC' and CA' occur at points 252 and 254. These torque curves in particular point out the advantage of utilizing a unipolar 3-phase motor architecture. In this regard, by commutating at a theoretical 50% of maximum torque amplitude for succeeding phase energizations, the efficiency of the motor improves substantially over one or two phase operation, although it will not achieve the efficiencies of a similar motor under 3-phase bipolar control.

However, as noted above, the third aspect of the trilogy must be addressed, that of providing a commutational system of competitive cost and in case of 3-phase unipolar operation one which practically and efficiently treats collapsed field phenomena in order to control the cost of power switching.

Looking additionally to FIG. 10, the commutational-step defining winding pair sequence for developing counterclockwise operation is set forth. For the instant figure, counterclockwise performance is considered in conjunction with the directional sense of arrow 260. Note in this regard that commutational-step winding pair CA' is energized to points 262 and 264, whereupon pair CA' is de-energized and winding pair BC' is energized. Commutation then takes place at points 266 and 268 with the de-energization of winding pairs BC' and energization of winding pairs AB'. The system then continues with commutation at points 270 and 272 and a return to the energization of winding pair CA'.

The earlier discussion with respect to the trilogy of innovations looks to the impractical cost associated with the use of multiple sensors in the commutation scheme. While a three sensor based commutational device is described in connection with sensors 230–232, that description was presented inasmuch as motors 10 and 80 were commutated in that fashion. However, it is desirable that the 3-phase unipolar motors utilize a single point sensing approach as described in application for U.S. patent Ser. No. 10/706,412 (supra) which is incorporated herein by reference. One embodiment of that single point sensing is represented in phantom in FIG. 9. In this regard, a single Hall effect sensor is shown in phantom at 280. Sensor 280 may perform, for example, in conjunction with a sensible system magnetic assembly schematically portrayed in phantom at 282. System 282 rotates with the rotor 220 and may be implemented in a variety of ways including the utilization of a slave disk which rotates with the rotor. Note that there are six sensible system poles for each rotor north/south pole pair and thus for each 360° of electrical rotation. Again, for 3-phase unipolar commutation, it further is assumed for the instant demonstration that the control system will react only to south to north transitions in the sensible system magnetic region array 282. It may be observed that when the rotor 220 poles and sensible system 282 poles are in the orientation shown, the single sensor or Hall device 280 will be centered on a sensible system north pole. Note in the torque curves that an AB' stable position will be located at arrows 284 and 286. At this position, without commutation of a next winding pair, rotor 220 would be stabilized and theoretically stationary. Note that arrows 284 and 286 extend upwardly to intersect winding pair torque curve BC' to intersect in a clockwise commutational sequence. Extensions of arrows 284 and 286 respectively at points 288 and 290 represent the torque provided by winding pair BC' when the rotor is in the stable alignment position represented by the arrows. Accordingly, winding pair AB' represents, in effect, a reference phase for pre-positioning the rotor 220 at a location whereupon by carrying out the excitation of winding pair BC' a significant torque is present to start the motor. Upon starting, the above-described commutational sequence occurs. Stable positions and associated reference phases can also be located with respect to counterclockwise movement of the rotor 220.

Looking now to FIG. 11, in general, the switching devices as at Q1–Q3 will be rated to perform with voltage surges occasioned from collapsing fields with major energy content below approximately three to about five times the rail voltage as at line 304. Switching devices configured as field effect transistors as at transistors Q1–Q3 generally are employed in connection with lower voltage motors. However, as voltages increase, for example, to a line voltage of about 150 volts, then insulated gate bipolar transistors (IGBT) typically are employed as the switching devices. Note that the FET symbols Q1–Q3 are configured showing respective Zener diodes D1–D3 extending across their drain and source terminals. These diodes D1–D3 are referred to as "body" diodes or "inherent" diodes and function to clamp any relatively small amount of energy encountered above the device rated voltages. Without the BUD topography as illustrated, the switching devices when utilized with standard 3-phase unipolar architecture, would be called upon to confront collapsing fields with voltage excursions of 20 to 50 times common or rail voltage. As a consequence, 3-phase unipolar motor designs which are called upon to produce power levels of more than a few Watts have been required to incorporate relatively expensive corrective circuitry to accommodate those large surges, somewhat severely limiting the applicability and cost practicality of the otherwise highly desirable 3-phase unipolar motor drive commutational technique. Collapsing fields encountered with the BUD topography are ones wherein the major energy of the flyback voltage spike is of substantially limited amplitude, i.e., between about three and about five times rail voltage and that excursion will be of importantly limited duration. While the switching devices can endure rather high back EMF spikes, where those spikes exhibit significant overvoltages of extended duration, the switching devices often will fail.

The development of an equivalent circuit for winding pairs 300–302, as shown in FIG. 11, and their associated switching devices Q1–Q3 will exhibit a series inductor, a series resistor and a parallel capacitance with values that change with frequency. Thus, in the presence of a collapsing field, the commutation system emulates a resonant or tank circuit with a ringing frequency often in excess of about 10,000 Hz to about 25,000 Hz. However, a serendipic combination occurs with the utilization of processed pressed powder stator core assemblies. These core materials are more responsive to a wider frequency range. The materials' ability to couple energy with frequency components extending above 10,000 Hz and exhibit low eddy current losses contrasts with a laminate material which will exhibit extensive eddy current losses and resultant heat build-up especially at the higher frequencies. While hysteresis losses as generally described in connection with a B-H curve analysis remain for both materials, the overall performance of the ringing equivalent circuits utilizing processed pressed powder stator cores is quite desirable as evidenced by the test data to follow: Additionally, the BUD winding topology, which utilizes oppositely polarized phase windings at each stator pole with two-thirds of the stator poles being energized at any time in the commutation sequence, reduces the winding turns energized at a single pole thereby increasing the effective saturation point at that pole or, alternatively, allowing a smaller stator pole cross-section as compared to conventional unipolar 3-phase designs.

Figure 12:
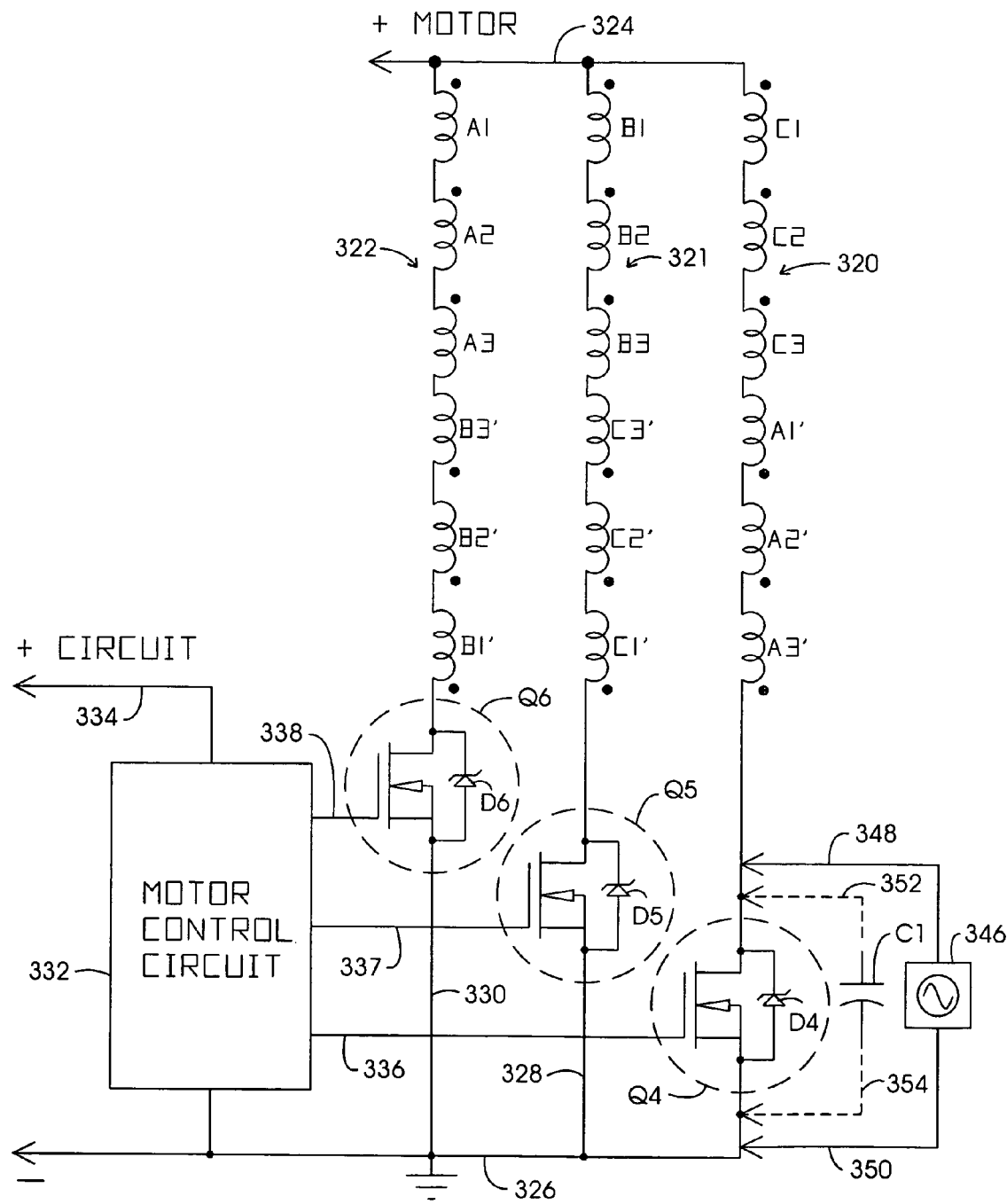
FIG. 12 is an electrical schematic diagram showing a BUD topology employed with the motors of FIGS. 1–3 and 4–5 and further showing a positioning for oscilloscope monitoring.

Referring to FIG. 12, an electrical schematic diagram of the motor commutation circuit employed in testing the motors represented at FIGS. 1–3 and 4–5 is revealed. It may be recalled that these motors as at 10 and 80 exhibited a topology of nine stator poles performing in association with a rotor having six poles or regions of alternating polarity. In the figure, winding pair CA' is represented in general at 320 along with winding start dots. Winding pair BC' is represented in general at 321 along with winding start dots; and winding pair AB' is represented in general at 322 along with winding start dots. The assignment of winding positions within the winding pairs 320–322 is provided in progressive alphanumeric fashion for illustrative convenience. However, the windings were located to derive the most efficient winding scheme. The serially coupled winding pairs 320–322 are seen coupled with common or rail voltage as represented at line 324 and extend to the drain terminals of switching devices Q4–Q6. The source terminals of devices Q4–Q6 extend to return line 326 in conjunction with lines 328 and 330. Line 326 extends to one input of a motor control commutation circuit represented at block 332 which also was coupled to a circuit source as represented at line 334. Devices Q4–Q6 were implemented as field effect transistors (FET). Accordingly, each exhibited an inherent or body diode as represented respectively at D4–D6. The transistors Q4–Q6 were commutationally gated from gate lines as shown respectively at 336–338.

The curves to follow were generated utilizing a digital storage oscilloscope, for example, marketed by Nicolet which is symbolically represented at 346. This oscilloscope was coupled across the drain and source terminals one of the solid state switches. For illustrative purposes, oscilloscope 346 is shown coupled across device Q4 as represented by arrows 348 and 350.

Motor 80 with its two versions is the smaller of the motors from which the majority of the curves to follow were derived and was tested as a version X with the BUD topology and as a version Y with a conventional 3-phase unipolar topology. This smaller motor, operating with a 15.0 VDC rail voltage or common also was evaluated with a very small capacitor having a value of 0.1 uf capacitance located across the drain to source terminals of the monitored power switching FET as represented at capacitor C1 in combination with dashed arrows 352 and 354. For motors operating at lower voltages, the collapsing field voltage excursion may be at a higher multiple of the rail voltage. The small capacitor C1 was employed to remove some of the back EMF initial peak energy for such motors. Motors utilizing larger supply or rail voltages generally will exhibit a greater turn established inductive coupling which, in itself, effects more of a limitation on the amplitude of the collapsing field voltage excursion.

Stator core assemblies for motors 10 and 80 were formed of the noted processed magnetic composite pressed powder metal of a type EXT-1 provided by Hoeganaes of Cinnaminson, N.J. A nine pole stator structure of motor 80 in the noted version X was double wound with twenty-eight turns of number 24 AWG wire per pole. For this version with the BUD topology, and the noted test voltage of 15.0 VDC, the motor was operated at a motor load of 300 gm. cm., about a 30% load.

Version Y of motor 80 was wired for 3-phase standard unipolar drive with approximately an equivalent winding of fifty turns of number 24 AWG wire per pole and employing the same test voltage and motor load. Motor 80 has an outside diameter of 66 mm.

Larger motor 10 exhibited an external diameter of 96 mm and was only configured with a BUD system topology. In this regard, the motor was double wound with eighty-six turns of number 26 AWG wire per pole and was operated at a rail or test voltage of voltage of 80.0 VDC under a motor load of 2500 gm.cm. which represents about a 30% load. Motor 10 exhibited a maximum output power of about 120 watts, whereas motor 80 exhibited a maximum output power of about 26 watts.

Figure 13:
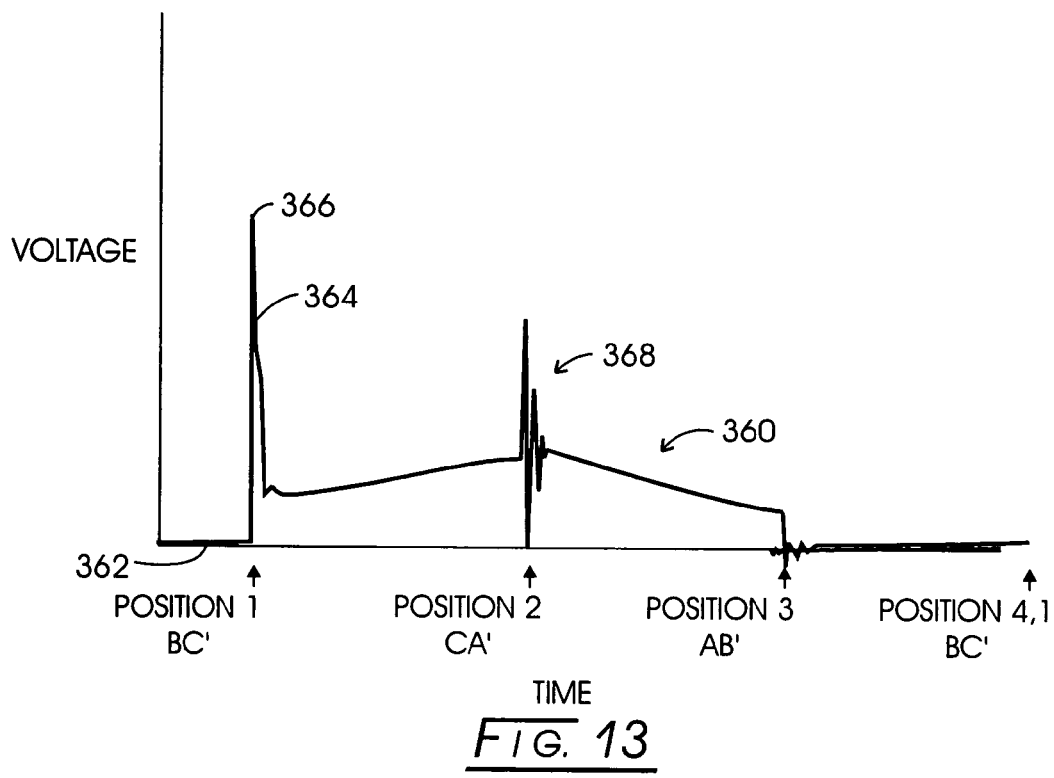
FIG. 13 is a copy of an oscillotrace of an entire back EMF waveform for a version X of the motor of FIGS. 4 and 5 incorporating a BUD topology.
Figure 14:
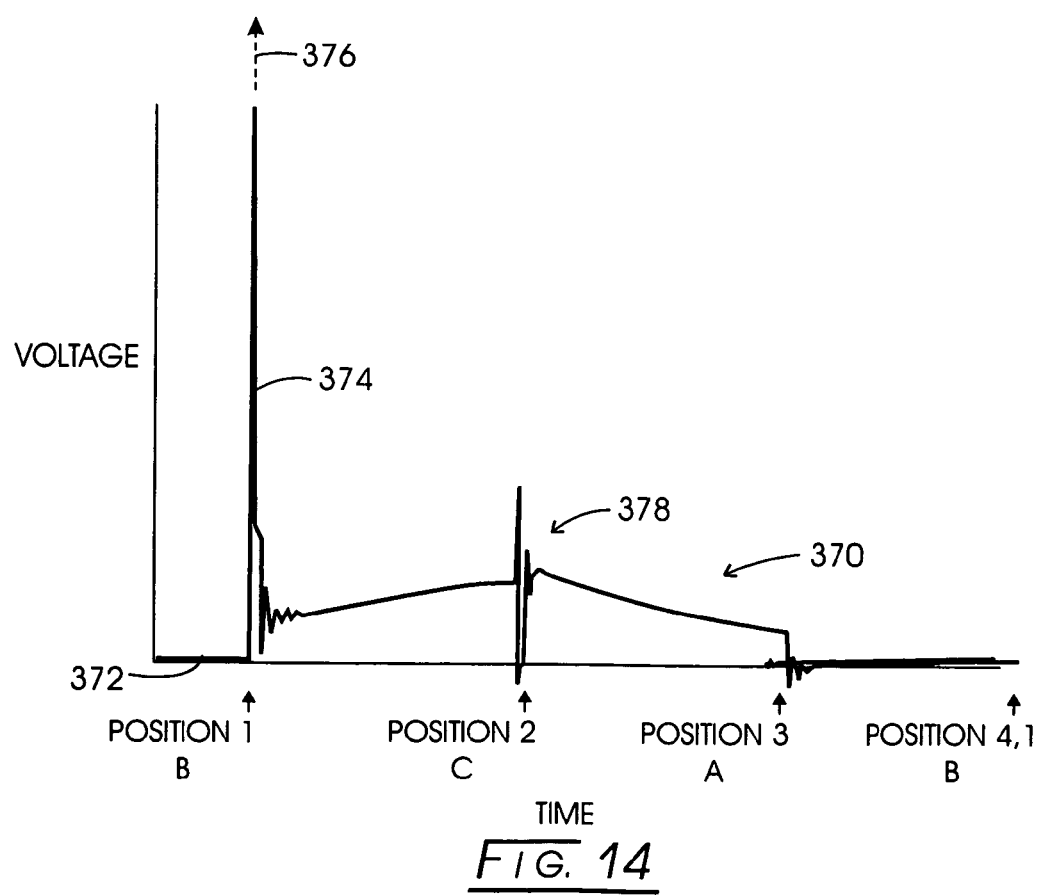
FIG. 14 is a copy of an oscillotrace of a motor having the architecture of FIGS. 4 and 5 but representing a version Y wherein the motor is wound in 3-phase unipolar fashion.

FIG. 13 illustrates an oscillotrace of the entire collapsing field flyback and back EMF voltage of one of the 3-phases of version X of motor 80. This motor, it may be recalled is configured with a BUD system topology. For comparative purposes, FIG. 14 illustrates an oscillotrace of the entire flyback and back EMF voltage of one of the 3-phases of version Y of motor 80 having a conventional 3-phase unipolar drive topology.

Returning to FIG. 13, the entire flyback oscillotrace is represented generally at 360. Trace 360 was developed with a 160 volt full scale oscilloscope setting in combination with a 500 nano second time element per data point. Thus, one sees one electrical cycle in the motor rotational sequence. To facilitate the description to follow, the trace 360 is identified in terms of time along the abscissa with positions 1 through 3 being followed by position 4 or the repeat of a position 1 (4, 1). The motor 80 will have traveled 360° electrical degrees between position 1 and position 4,1. This curve was generated with the oscilloscope across the drain to source of FET Q5 in FIG. 12. For illustrative purposes, it is arbitrarily assumed that prior to position 1 at trace portion 362 winding pair BC' will have been energized and that a clockwise commutation is at hand following the arbitrary sequence of FIG. 10. At position 1 winding pair BC' will have been turned off and, simultaneously, winding pair CA' will have been turned on. At the termination of the energization of winding pair BC', a collapsing field ensues with the flyback voltage or spike represented at trace portion 364 extending to a position of maximum amplitude represented at 366. Seen at the instant scale is a ringing occurring slightly to the right of position 1 appearing at the commencement of a small ledge or ramp. Again following the arbitrary commutation sequence of FIG. 10, between position 1 and position 2, for example, winding pair CA' will be energized for 120° electrical motor travel, whereupon at position 2 it is turned off. The excursion seen at 368 in the trace represents the turning off of that next winding pair in the commutational step sequence. Then, for example, between positions 2 and 3, the next winding pair in the commutational step sequence, AB' will be energized and turned off at position 3. The sequence, repeats, winding pair BC' then being turned on between position 3 and position 4,1.

Returning to FIG. 14 an oscillotrace represented generally at 370 is presented which was developed with version Y of motor 80 wherein it was wired for conventional 3-phase unipolar drive. Those phases are represented arbitrarily in an illustrative phase sequence of A, B, C. As in the case of FIG. 13, the oscilloscope was configured to look at one of the three phases with 160 volts full scale and with 500 nano-seconds per data point. It may be observed that trace 370 has a quite similar appearance to trace 360 of FIG. 13. As in the case of FIG. 13, positions 1–4,1 are illustrated, the electrical motor travel between position 1 and position 4,1 again being 360° electrical. As before, an arbitrary phase B will have been assumed to be on, for example, at trace portion 372 and turned off at position 1. Then the resultant collapsing field will evolve the flyback spike represented at trace portion 374. The amplitude of this spike 374 is well off scale as represented by dashed arrow 376. Ringing occurs, as located at the commencement of a slight ramp, to the right of spike 374. With the turning off of phase B, arbitrary phase C is turned on whereupon at position 2 it is turned off to create the disturbance in the trace as represented at 378. With the turning off of phase C, arbitrary phase A is turned on and remains on between positions 2 and 3. At position 3, phase A is turned off and phase B is turned on again. That on condition of phase B is maintained until position 4,1 whereupon the commutational cycle repeats itself. Comparison of curves 360 and 370 reveals that motor 80, when configured with a BUD topology exhibits a substantially reduced amplitude of the collapsing field commutational spikes.

Figure 15:
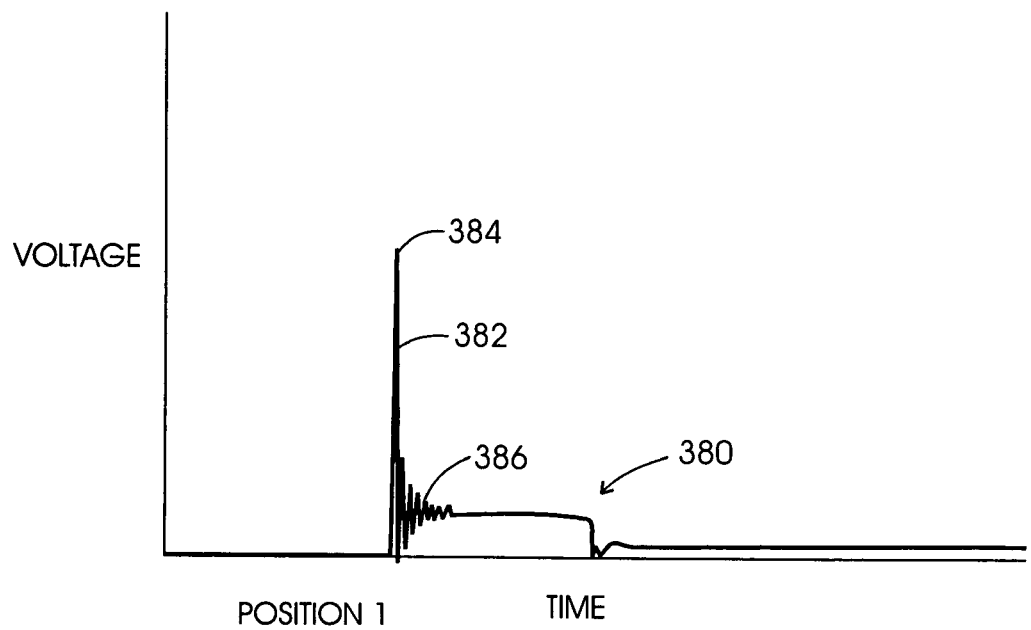
FIG. 15 is a copy of an oscillotrace with an enlarged time scale representing a portion of position 1 shown in FIG. 13.
Figure 16:
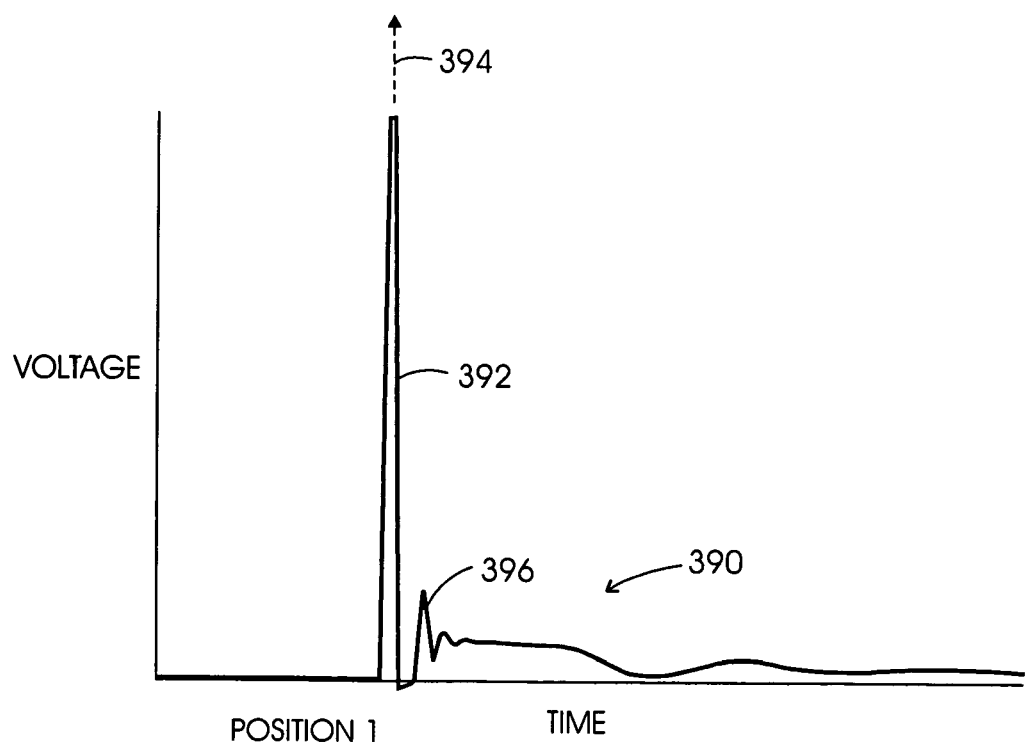
FIG. 16 is a copy of an oscillotrace with the same enlarged time scale showing a portion of position1 as identified in FIG. 14.

Now looking to FIGS. 15 and 16, the oscilloscope 346 was configured to essentially look at a portion of position 1 of FIG. 13. In FIG. 15, the leading edge of the flyback voltage curve 364 of FIG. 13 is represented in general at trace 380. Trace 380 was developed with the oscilloscope 346 being configured to provide 670 volts full scale in conjunction with a 100 nano-second timing per data point. In effect, position 1 is blown-up by a factor of about 32 in terms of time. Thus, position 2 of FIG. 13 would be off to the right in the sense of FIG. 15 by one or more drawing sheets. Curve 380 is concerned with version X of motor 80 having a BUD system topology. The collapsing field occasioned spike is represented at trace portion 382. Note that this spike extends to a maximum amplitude represented at position 384. Ringing is seen at region 386 of trace 380, whereupon the trace flattens. That flattened region corresponds with the very small rightwardly depending ramp or ledge within spike trace 364. Trace 380 further illustrates the reduced energy in terms of voltage and time present in the leading edge of the flyback voltage curve of motor 80 as wired with a BUD system topology.

Referring to FIG. 14, a trace represented generally at 390 developed in conjunction with version Y of motor 80 is illustrated. As represented at trace 380 in FIG. 15, trace 390 represents only a position 1 region for the leading edge of the flyback voltage trace 374 of FIG. 14. As before, the oscilloscope 346 was configured for 670 volts full scale and with 100 nano-seconds per data point. Thus, trace 390 may be compared with trace 380. Note that with the collapsing field, a resultant flyback spike as represented at trace portion 392 is evoked. The maximum amplitude of spike 392 is again off-scale as represented by dashed arrow 394. Note, additionally, that the spike 392 is relatively wide in duration with respect to spike 382 shown in FIG. 15. This represents a higher energy content. Trace component 392 is followed by a ringing region represented at 396, whereupon the trace flattens. That flattened region corresponds with the commencement of the small ramp or ledge seen to the right of spike 374 in FIG. 14.

FIG. 15, when compared with FIG. 16 shows that with the BUD system topology, the body diodes as described at D4–D6 in conjunction with FIG. 12 are subjected to a much smaller and more manageable energy excursion in the presence of an occurrence of a collapsing field.

Figure 17:
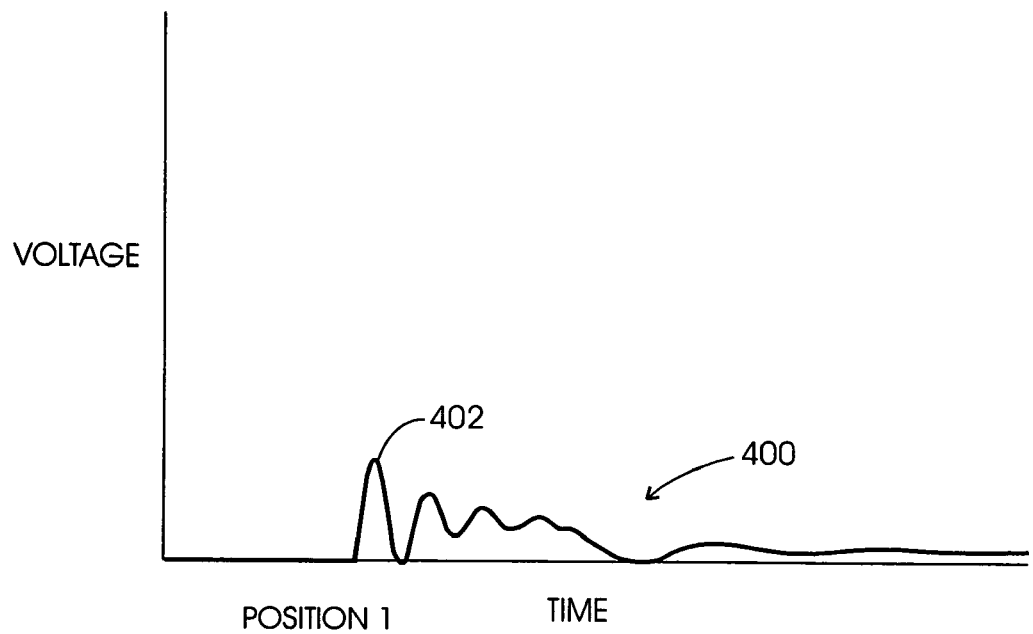
FIG. 17 is an oscillotrace of a portion of position 1 of version X of the motor of FIGS. 4 and 5 with the same time scale as FIG. 15 configured with a capacitor connected across its switching device terminals.

Turning to FIG. 17, an oscillotrace of the leading edge of the spike-represented collapsing field of FIG. 15 is presented in general at 400. For this trace, the oscilloscope 346 was configured in the same manner as FIG. 13 with 670 volts full scale and 100 nano-seconds per data point. However, the small capacitor of 0.1 uf capacitance as described at C1 in FIG. 12 was deployed. Note the diminution of the collapsing field spike at trace region 402.

Figure 18:
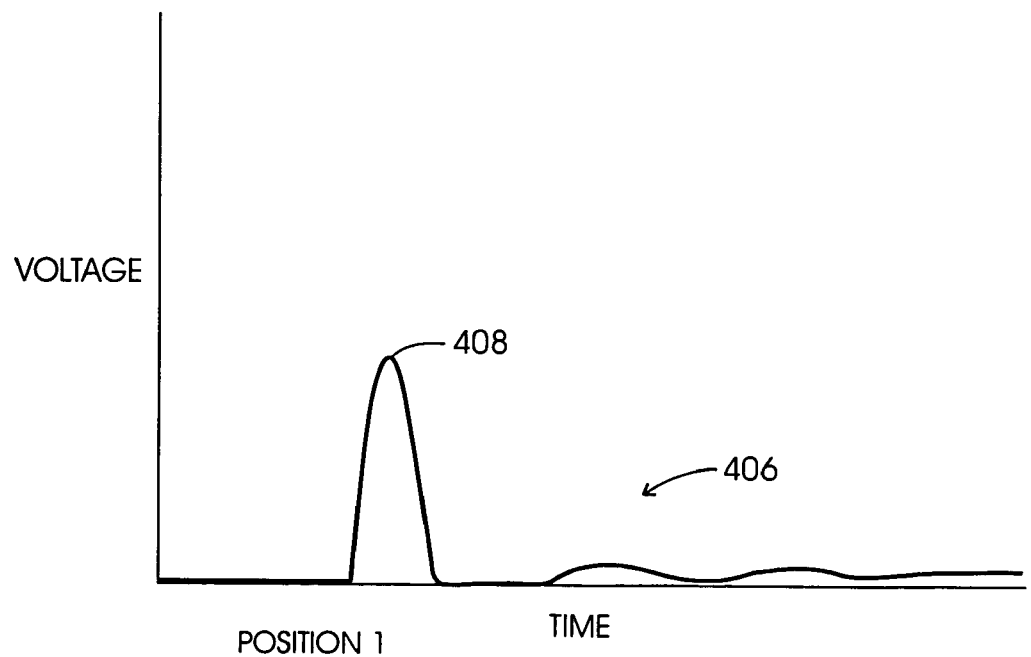
FIG. 18 is a copy of an oscillotrace of a portion of position 1 of version Y of the motor of FIGS. 4 and 5 with the same time scale as FIG. 16 with a capacitor connected across the terminals of the monitored switching device.

Referring to FIG. 18, the same oscilloscope 346 configurations were employed as utilized in connection with FIG. 16. The noted capacitor C1 with a 0.1 uf capacitance was positioned across the drain and source terminals of the power switching FET. The resultant oscillotrace is shown in general at 406 and a diminution of the back EMF spike amplitude is evidenced at trace region 408. As before, both FIGS. 17 and 18 are concerned with the leading edge region of position 1.

Figure 19:
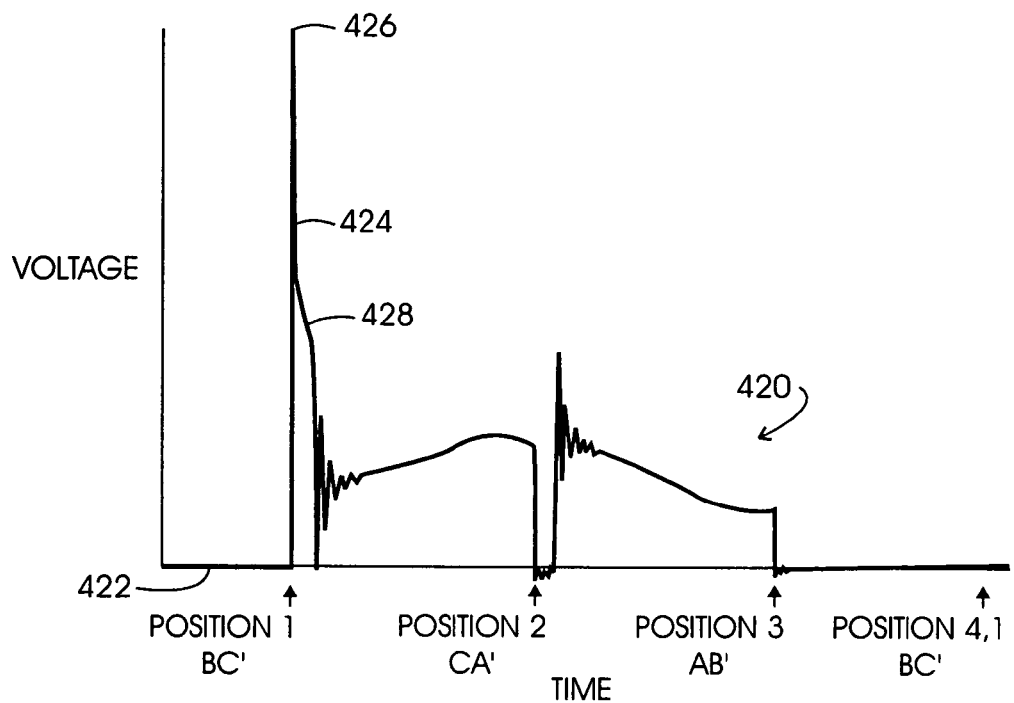
FIG. 19 is a copy of an oscillotrace of the entire flyback phenomena of the motor of FIGS. 1–3.

Now considering the larger motor 10, it may be recalled that this motor performed with a rail voltage of 80.0 volts d.c. with a maximum output power of about 120 watts. Looking to FIG. 19, an oscillotrace is represented generally at 420 showing the entire flyback voltage, back EMF cycle one of the three phases of the motor developed with an oscilloscope 346 configuration of 670 volts full scale with one usec per data point. Accordingly, the four positions, 1, 2, 3 and 4,1 again may be located, it being recalled at the electrical travel of the motor between position 1 and position 4,1 is 360° electrical. For convenience, the same winding pair commutational step designation is arbitrarily assigned in the figure along the position locations. Accordingly, at introductory trace region 422 winding pair BC' is arbitrarily designated as being on. As position 1 is reached, that winding pair is turned off and winding pair CA' is energized. The resultant field collapse signal is manifested as a flyback voltage or spike represented at 424. Spike 424 extends upwardly in amplitude to a position of maximum amplitude 426 representing a manageable value. A small trailing ledge is exhibited at trace region 428 following position 1. At position 2 the arbitrarily designated next time location in the commutational sequence, winding pair CA' is turned off and winding pair AB' would be turned on. At position 3, again utilizing this arbitrary sequence of winding pairs, the winding pair AB' is turned off whereupon winding pair BC' would be energized to repeat the commutational step sequence.

Figure 20:
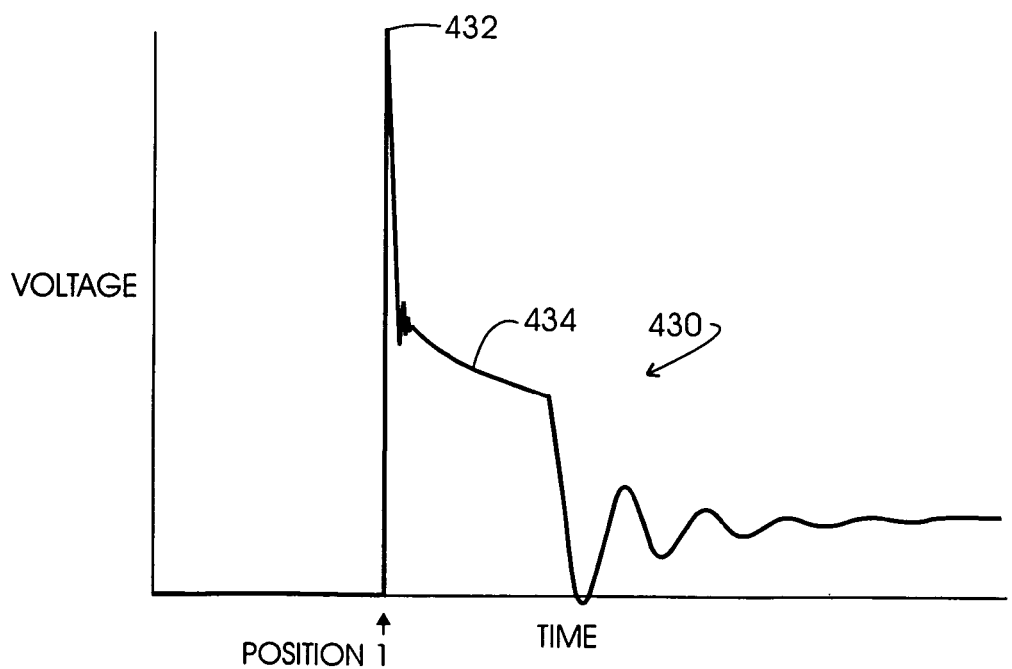
FIG. 20 is an oscillotrace of portions of position 1 shown in FIG. 19 with an enlarged time scale.

Referring to FIG. 20, an oscillotrace is represented generally at 430 which corresponds to oscillotrace 420 but is looking only to the region of position 1. In this regard, oscilloscope 346 was configured with the same voltage amplitude scale of 670 volts full scale. However, the data point timing along the abscissa was changed to 200 nanoseconds per data point. Accordingly, a small portion of the leading edge extending from position 1 is revealed but at an enhanced level of timing detail. Trace 430 is seen to extend again to a position of maximum amplitude at 432 which is well within switching device tolerances. The small ledge 428 now is expanded at trace region 434.

Turning to FIG. 21 and revisiting the performance of motor 80 as it is configured in versions X and Y, trace 380 from FIG. 15 is reproduced at a higher scale in sold line fashion. As before, the trace exhibits a flyback spike 382 having a position of maximum amplitude at 384. Ringing is seen at 386. Superposed with trace 380 is trace 390 from FIG. 16. Trace 390 is plotted at the same scale as trace 380. Flyback spike 392 is seen at this expanded scale to go off-scale as represented at arrow 394. The position of peak amplitude for version Y will occur off-scale at between about 1000 volts and 1200 volts. Additionally, it is important to note that this conventional unipolar wound motor exhibits a spike of considerably larger duration than spike 382. In this regard, the time duration of spike 392 is about three times that of spike 382. This expansion in time duration of the spike represents energy which may destroy the associated switching device without the utilization of somewhat costly corrective circuitry.

Since certain changes may be made in the above apparatus and method without departing from the scope of the invention herein involved, it is intended that all matter contained in the above-description or shown in the accompanying drawings shall be interpreted as illustrative and not in a limiting sense. All citations referred to above are expressly incorporated herein by reference.

The invention claimed is:

1. An electric motor having at least three phases, comprising:
   a rotor rotatable about a motor axis;
   a stator core assembly having a plurality of stator poles;
   a field winding assembly configured for single sided energization from a source and comprising a phase component winding at each said stator pole energizable from said source in a first polar sense and a phase companion winding in inductive coupling relationship with said phase component winding at each said stator pole and energizable from said source in a second polar sense opposite said first polar sense, a said phase component winding of one said phase being electrically coupled with a said phase companion winding at another said phase to provide the field windings corresponding with a commutational-step defined winding pair; and
   a control circuit responsive to energize said field windings from said source configured for said single sided energization of said phases to effect the driven rotation of said rotor, and commencing on said commutational step the additive coupling of at least a portion of the collapsing field energy derived at the termination of energization of the phase companion winding for one said defined winding pair with the phase component winding of another defined winding pair.

2. The electric motor of claim 1 in which:
   said phase component winding and inductively coupled phase companion winding are bifilar wound about a said stator pole.

3. The electric motor of claim 1 in which said stator poles are formed of pressure shaped processed powdered metal.

4. The electric motor of claim 1 in which:
   said phase component winding and said phase companion winding have the same number of turns per stator pole.

5. The electric motor of claim 1 in which:
   said electric motor has three phases;
   said control circuit energizes said field windings at a given switching frequency, f1;
   said collapsing field energy is present at least in part at a resonating frequency, f2, greater than said frequency, f1, and
   said stator poles are formed of pressure shaped processed powdered metal.

6. The electric motor of claim 1 in which:
   said field winding assembly is configured with three phases designated A, B and C, and is formed with three unipolar legs, one said leg being formed with one or more phase component windings, A in series with one or more phase companion windings, B', a second said leg being formed with one or more phase component windings, B in series with one or more phase companion windings, C', a third said leg being formed with one or more phase component windings, C in series with one or more phase companion windings, A'.

7. The electric motor of claim 6 in which:
   said control circuit energizes said field windings in correspondence with a three step commutational step sequence comprising the steps: BC'; CA' and AB' in a pre-selected order.

8. The electric motor of claim 1 in which:
   said field winding assembly is configured as three unipolar legs each corresponding with a said winding pair and having one or more serially connected phase component windings corresponding with one phase and one or more phase companion windings corresponding with a phase different than said one phase, each said unipolar leg being coupled between said source and one of the motor connection terminals of said control circuit and energizable to effect said energization of said serially coupled phase component and phase companion windings.

9. The electric motor of claim 8 in which:
said control circuit further comprises a capacitor coupled across each said motor connection terminal to reference or ground.

10. A three phase electric motor driven by a control circuit in a three step commutational step sequence in 360 degrees of electrical rotation comprising:
a permanent magnet rotor;
a stator core with three or more, in multiples of three, stator poles;
a field winding on each stator pole comprising a primary winding and a secondary winding;
a circuit assemblage wherein interconnection of all primary windings on all stator poles of one of said three phases with all the secondary windings on all stator poles of a second of said three phases in a manner which creates a winding phase pair with a polar difference when energized on those stator poles of said primary windings versus those stator poles of said secondary windings; and
three said winding phase pairs being further connected between a common source of a given polarity and one of three commutating power switching devices of said control circuit actuable to effect energization and de-energization of each interconnected winding phase pair in said commutational step sequence.

11. The electric motor of claim 10 in which:
said primary and secondary windings are bifilar wound about a stator pole.

12. The electric motor of claim 10 in which:
two-thirds of said stator poles of said stator core are actuated at any step of said commutational step sequence.

13. The electric motor of claim 10 in which:
said stator core is formed of pressure shaped processed powdered metal.

14. The electric motor of claim 10 in which:
a capacitor is coupled across the power handling terminals of each said power switching device of said control circuit.

15. The electric motor of claim 10 in which:
said three step commutational sequence is produced by said control circuit operating with a single sensor input operatively associated with a sensible structure mounted on said permanent magnet rotor.

16. The electric motor of claim 15 in which:
said sensible structure comprises:
a sequence of regions of magnetic fields; and
said single sensor is a Hall effect device.

* * * * *